US006362118B1

(12) United States Patent
Beall et al.

(10) Patent No.: US 6,362,118 B1
(45) Date of Patent: Mar. 26, 2002

(54) METHOD OF MAKING STABILIZED NEGATIVE THERMAL EXPANSION OPTICAL WAVEGUIDE SUBSTRATE AND A GLASS-CERAMIC SUBSTRATE

(75) Inventors: George H. Beall, Big Flats; Joel P. Carberry, Horseheads; Kenneth Chyung; Joseph E. Pierson, both of Painted Post; Kamjula P. Reddy; James E. Webb, both of Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/553,109

(22) Filed: Apr. 20, 2000

Related U.S. Application Data
(60) Provisional application No. 60/130,896, filed on Apr. 23, 1999.

(51) Int. Cl.⁷ ............................................. C03C 10/12
(52) U.S. Cl. ................. 501/7; 501/4; 501/10
(58) Field of Search ................... 501/7, 4, 10

(56) References Cited

U.S. PATENT DOCUMENTS

| | | | | |
|---|---|---|---|---|
| 4,209,229 A | * | 6/1980 | Rittler | |
| 5,042,898 A | * | 8/1991 | Morey et al. | |
| 5,067,975 A | * | 11/1991 | Backer et al. | |
| 5,132,178 A | * | 7/1992 | Chyung et al. | |
| 5,132,256 A | * | 7/1992 | Beall et al. | |
| 5,140,665 A | * | 8/1992 | Backer et al. | |
| 5,180,411 A | * | 1/1993 | Backer et al. | |
| 5,186,729 A | * | 2/1993 | Brown et al. | |
| 5,426,714 A | * | 6/1995 | Gadkaree et al. | |
| 5,494,721 A | * | 2/1996 | Nakagawa et al. | |
| 5,904,983 A | * | 5/1999 | Chan et al. | |
| 5,926,599 A | * | 7/1999 | Bookbinder et al. | |
| 6,066,585 A | * | 5/2000 | Swartz | |
| 6,087,280 A | * | 7/2000 | Beall et al. | |
| 6,122,430 A | * | 9/2000 | Bookbinder et al. | |
| 6,187,700 B1 | * | 2/2001 | Merkel | |
| 6,209,352 B1 | * | 4/2001 | Beall et al. | |
| 6,243,527 B1 | * | 6/2001 | Dawson-Elli | |

* cited by examiner

Primary Examiner—Tom Dunn
Assistant Examiner—Colleen P. Cooke
(74) Attorney, Agent, or Firm—Svetlana Z. Short

(57) ABSTRACT

The invention includes methods of stabilizing negative thermal expansion glass-ceramic optical waveguide substrates. The invention includes the stabilized negative thermal expansion glass-ceramic optical waveguide substrates. The stabilized substrates have very stable physical characteristics such as dimensional length when exposed to extreme environments. The stabilized substrates are used to athermalize optical waveguide devices such as optical fiber grating. The stabilized substrates are particularly well suited for providing athermalized fiber Bragg grating.

14 Claims, 16 Drawing Sheets

METHOD OF MAKING STABILIZED NEGATIVE THERMAL EXPANSION OPTICAL WAVEGUIDE SUBSTRATE AND A GLASS-CERAMIC SUBSTRATE

This application claims the benefit of U.S. Provisional Patent Application No. 60/130,896, filed on Apr. 23, 1999.

BACKGROUND OF THE INVENTION

1. Field of the Invention

The present invention relates generally to optical waveguide devices, and particularly to optical waveguide devices that include negative thermal expansion substrates which athermalize an optical waveguide. The substrate is made from a material having a negative thermal expansion so that the substrate shrinks with a rise in temperature which compensates for thermally varying optical properties of the optical waveguide device.

2. Technical Background

This invention relates to a temperature compensated, athermal optical device and, in particular, to a stabilized negative expansion substrate for utilization in an optical fiber reflective Bragg grating optical waveguide device and to a method of producing the stabilized athermalizing optical waveguide substrate.

Index of refraction changes induced by UV light are useful in producing complex, narrow-band optical components such as filters and channel add/drop devices.

These devices can be an important part of multiple-wavelength telecommunication systems. A popular photosensitive optical fiber device is a reflective grating (Bragg grating), which reflects light over a narrow wavelength band. Typically, these devices have channel spacings measured in nanometers.

There are already known various constructions of optical filters, among them such which utilize the Bragg effect for wavelength selective filtering. U.S. Pat. No. 4,725,110 discloses one method for constructing a filter which involves imprinting at least one periodic grating in the core of the optical fiber by exposing the core through the cladding to the interference pattern of two ultraviolet beams that are directed against the optical fiber at two angles relative to the fiber axis that complement each other to 180°. This results in a reflective grating which is oriented normal to the fiber axis. The wavelength of the light reflected by such an optical fiber with the incorporated grating filter is related to the spacing of the grating which varies either with the strain to which the grating region is subjected, or with the temperature of the grating region, in a clearly defined relationship, which is substantially linear to either one of these parameters.

For a uniform grating with spacing L, in a fiber with an effective index of refraction n and expansion a, the variation of center reflective wavelength, $l_r$ is given by $$dl_r/dT = 2L[dn/dT + na]$$

In silica and germania-silica fiber reflective gratings the variation in center wavelength is dominated by the first term in the brackets, the change of index of refraction with temperature. The expansion term contributes less than ten percent of the total variability. $dl_r/dT$ is typically 0.01 nm/° C. for a grating with a peak reflectance at 1550 nm.

One practical difficulty in the use of these gratings is their variation with temperature. In as much as the frequency of the light reflected by the fiber grating varies with the temperature of the grating region this basic filter cannot be used in applications where the reflected light frequency is to be independent of temperature. Methods of reliably and stably athermalizing the fiber reflective grating are needed to meet the rigorous and always growing optical telecommunications application demands and requirements for such gratings.

One method of athermalizing a fiber reflective grating is to thermally control the environment of the grating with an actively controlled thermal stabilization system. Such thermal stabilization is costly to implement and power, and its complexity leads to reliability concerns.

A second athermalization approach is to create a negative expansion which compensates the dn/dT. Devices which employ materials with dissimilar positive thermal expansions to achieve the required negative expansion are known.

U.S. Pat. No. 5,042,898 discloses a temperature compensated, embedded grating, optical waveguide light filtering device having an optical fiber grating. Each end of the fiber is attached to a different one of two compensating members made of materials with such coefficients of thermal expansion relative to one another and to that of the fiber material as to apply to the fiber longitudinal strains, the magnitude of which varies with temperature in such a manner that the changes in the longitudinal strains substantially compensate for these attributable to the changes in the temperature of the grating.

Yoffe, G. W. et al in "Temperature-Compensated Optical-Fiber Bragg Gratings" OFC'95 Technical Digest, paper WI4, discloses a device with a mechanical arrangement of metals with dissimilar thermal expansions which causes the distance between the mounting points of an optical fiber to decrease as the temperature rises and reduce the strain in a grating.

Another method of athermalizing optical waveguide devices utilizes a substrate for attachment with the optical fiber grating with the substrate fabricated from a material with an intrinsic negative coefficient of expansion.

SUMMARY OF THE INVENTION

One aspect of the present invention is a method of making a negative thermal expansion substrate which includes the steps of: providing a dimensionally unstable negative glass-ceramic with microcracks which have lengths and crack tips; driving the microcracks so as to increase the length of the microcracks of the provided glass-ceramic; and sealing the crack tips of the driven microcracks that have an increased length.

In another aspect, the present invention includes a method of making a negative thermal expansion substrate including the steps of: providing a negative expansion glass-ceramic having microcracks, and submerging the glass-ceramic in a liquid bath having a temperature less than 30° C.

In a further aspect the invention comprises a method of making a negative thermal expansion substrate with the steps of: providing a negative expansion glass-ceramic having a plurality of microcracks, and exposing the glass-ceramic for at least twelve hours to a humid atmosphere having a relative humidity of at least 80% and a temperature of at least 80° C.

In another aspect, the present invention includes a negative thermal expansion substrate for athermalizing an optical waveguide device for use in an optical waveguide deployment environment. The substrate includes a microcracked negative thermal expansion glass-ceramic body having a dimensional length, with the glass-ceramic body having a plurality of microcracks, with the microcracks having a stabilized saturated subcritical crack growth length wherein the dimensional length of the glass-ceramic body is stabilized when exposed to the optical waveguide deployment environment.

In a further aspect the invention includes a negative thermal expansion substrate for athermalizing an optical waveguide device, with the substrate including a microcracked negative thermal expansion glass-ceramic body having a plurality of microcracks terminating with a crack tip wherein the microcrack crack tips are substantially filled with a percipitant of glass-ceramic constituents leached from the glass-ceramic body.

The inventive substrates provide a high degree of dimensional stability under the long term exposures of humidity at various temperatures experienced with optical waveguide deployment environments.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying figures are included to provide a further understanding of the invention, and are incorporated in and constitute a part of this specification. The figures illustrate various embodiments of the invention, and together with the description serve to explain the principles and operation of the invention.

DETAILED DESCRIPTION OF THE PREFERRED EMBODIMENTS

Figure 1:
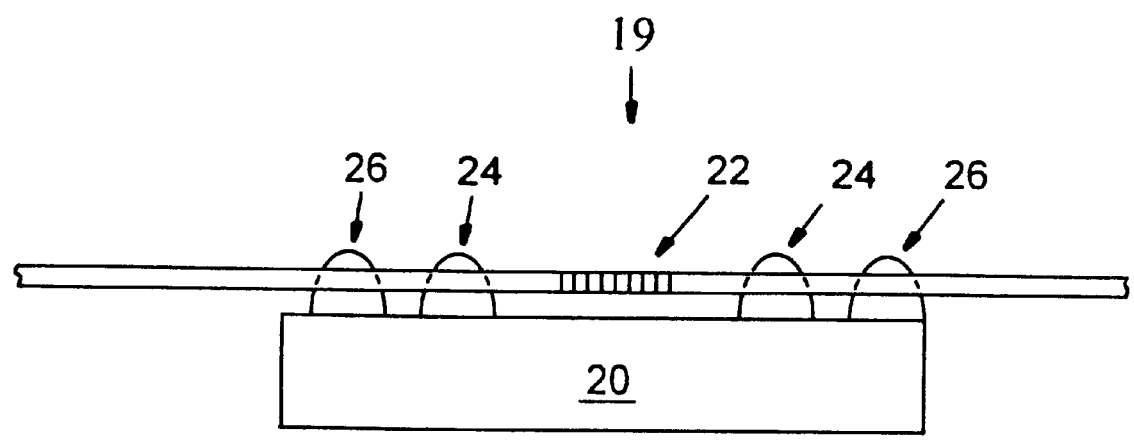
FIG. 1 is a side view of an optical waveguide device embodying the Invention.

Reference will now be made in detail to the present preferred embodiments of the invention, examples of which are illustrated in the accompanying drawings. An exemplary embodiment of an athermalizing optical waveguide negative thermal expansion substrate of the present invention is shown in FIG. 1, and is designated generally throughout by reference numeral 20.

In accordance with the invention, the present invention for a method of making a negative thermal expansion substrate includes the step of providing a dimensionally unstable negative thermal expansion glass-ceramic. The invention stabilizes this dimensionally unstable glass-ceramic to provide a substrate 20 for proper athermalization control of an optical waveguide device 22.

The invention provides a method of making a negative thermal expansion substrate that includes the steps of providing a negative thermal expansion glass-ceramic with microcracks which have lengths and crack tips. The method includes driving the microcracks so as to increase the length of the microcracks and move the crack tips. The method further includes sealing the moved crack tips of the driven microcracks that have an increased length. Preferably the provided glass-ceramic is a dimensionally unstable negative expansion glass-ceramic that preferably has a thermal expansion coefficient in the range from $-30 \times 10^{-7}/°$ C. to $-90 \times 10^{-7}/°$ C. in the temperature range of $-40°$ C. to $85°$ C. The provided glass-ceramic is preferably a lithium aluminosilicate glass-ceramic that includes anisotropic thermal expansion crystals of beta-eucryptite, which preferably have crystal sizes greater than 5 $\mu$m which provide for the microcracks and the negative thermal expansion. The negative expansion glass-ceramic has at least one microcrack and usually has a plurality of microcracks. The microcracks of the provided glass-ceramic each have a first undriven length that terminates with a crack tip.

The inventive method of making the negative thermal expansion substrate further includes utilizing the made substrate with an optical waveguide device assembly in which the substrate athermalizes an optical waveguide device so that the substrate is an optical waveguide negative thermal expansion substrate. Preferably the optical waveguide device is a fiber Bragg grating. Preferably providing the substrate comprises providing a substrate that is in a dimensionally unstable first state with first microcrack lengths, which under normal fiber Bragg grating optical waveguide device working conditions transforms into a second state with second microcrack lengths longer than said first microcrack lengths with the second state substrate having different dimensional lengths and elastic modulus compared to the first state substrate. The inventive method drives the first state substrate into a third state beyond the deployment environment regular use working condition second state wherein the third state has third state microcrack lengths which are driven longer than the second microcrack lengths. The produced substrate with third microcrack lengths longer than the second microcrack lengths provides for improved characteristics and stabilized properties, such as dimensional stability and stabilized elastic modulus, required for an improved athermalized optical waveguide device assembly such as a fiber Bragg grating.

Preferably the microcrack lengths are driven by applying a corrosive agent to stressed bonds at the microcrack crack tips. Driving the microcrack lengths preferably includes applying capillary forces to the microcracks and their crack tips. Preferably the microcracks are propagated and the crack tips are moved by exposing a liquid to the microcracks and the crack tips. Preferably such driving includes contacting the crack tips of the microcracks with water, with the water being the corrosive agent which drives the cracks and the source of capillary forces which also drive the cracks. In a preferred embodiment driving the microcracks includes exposing the microcracks to cool non-boiling water at a temperature less than 50° C., more preferably less than 20° C., more preferably less than 10° C., and more preferably less than 5° C. In a preferred embodiment the temperature of the water is about 0° C. Preferably the liquid is deionized water, but the water may contain molecules in addition to $H_2O$. For providing water exposure below 0° C., a freezing point depressant can be added to the water. Freezing point depressant additives such as alcohol (methanol or ethanol) and/or acetone could be used to provide a water bath solution below 0° C.

Preferably sealing the crack tips of the microcracks includes exposing the glass-ceramic to a humid atmosphere. Exposing the glass-ceramic to a humid atmosphere provides for a beneficial sealing of crack tips of driven microcracks which stabilizes the length of the microcracks. Such sealing stabilizes the dimensional lengths of the substrate and stabilizes the elastic modulus of the glass-ceramic substrate. Preferably exposing to a humid atmosphere includes exposing to an atmosphere which has a water concentration, a pressure, and a temperature such that water from the atmosphere condenses proximate the crack tips. Preferably such exposing includes exposing for a period of time sufficient to leach constituents from the glass-ceramic and percipitating the leached constituents proximate the crack tips. Such sealing includes filling the crack tips with constituents leached from their surrounding glass-ceramic, with the filling leached constituents in a non-liquid non-gas state such as a solid or a gel (semi-solid). Exposing the glass-ceramic to the humid atmosphere preferably fills the crack tips with a percipitant of glass-ceramic constituents leached from the glass-ceramic.

In an embodiment of the invention driving and sealing includes boiling the provided glass-ceramic in water, drying the boiled glass-ceramic, exposing the dried boiled glass-ceramic to a humid atmosphere, and drying the exposed dried boiled glass-ceramic. Beneficial substrates that provided athermalized optical waveguide fiber Bragg grating devices with environmentally stable reflection wavelengths were obtained by boiling the provided glass-ceramic in DI water for four hours which were then dried for 16 hours at 200° C. in a drying non-humid atmosphere. These dried boiled glass-ceramic bodies were then treated by one week of exposure to damp heat environment comprising a humid atmosphere of air at 85° C./85% relative humidity. These damp heat treated dried boiled glass-ceramic bodies were then dried for 16 hours at 100° C. in a drying non-humid atmosphere.

The invention further comprises a method of making a negative thermal expansion substrate including the steps of providing a negative expansion glass-ceramic having a plurality of microcracks and submerging the glass-ceramic in a liquid bath at or below room temperature, preferably having a temperature less than 25° C., preferably with the liquid bath including $H_2O$. Preferably submerging in a liquid bath includes submerging in a water bath having a temperature less than 20° C., more preferably less than 10° C., more preferably less than 5° C., and preferably with a temperature of about 0° C. In the preferred embodiment of the method, submerging the provided glass-ceramic in the water bath increases the length of the microcracks of the provided glass-ceramic. In a preferred practice the glass-ceramic is submerged for at least 8 hours, which ensures proper increasing of the microcrack lengths to provide beneficial and stable use properties that allow for utilization of the substrate in optical waveguide devices. The step of providing a microcracked negative expansion glass-ceramic preferably includes forming a lithium aluminosilicate glass and ceramming the lithium aluminosilicate glass to form anisotropic beta-eucryptic crystals wherein the glass-ceramic has a negative coefficient of thermal expansion less than $-20 \times 10^{-7}/°$ C. in the temperature range of $-40°$ C. to $85°$ C., and the crystals have a crystal size greater than 5 $\mu$m.

The invention further includes a method of making a negative thermal expansion substrate that comprises the steps of providing a negative expansion glass-ceramic having a plurality of microcracks and exposing the glass-ceramic for at least twelve hours to a humid atmosphere having a relative humidity of at least 80% and a temperature of at least 80° C. Preferably the exposing humid atmosphere has a relative humidity of at least about 85% and a temperature of at least about 85° C. Preferably exposing includes exposure to the humid atmosphere for at least one day. The method further includes drying the glass-ceramic after exposure to the humid atmosphere.

The invention further includes a negative thermal expansion substrate for athermalizing an optical waveguide device for use in an optical waveguide deployment environment. The substrate includes a microcracked negative thermal expansion glass-ceramic body having a dimensional length and a plurality of microcracks with the microcracks having a saturated subcritical crack growth third length wherein the dimensional length of the glass-ceramic body is stabilized when exposed to the optical waveguide deployment environment. In a preferred embodiment the optical waveguide device includes a fiber Bragg grating. Preferably the microcracked negative thermal expansion glass-ceramic body is a lithium aluminosilicate glass ceramic with beta-eucryptic crystals that have crystal grain sizes greater than 5 $\mu$m such that the glass-ceramic body has a thermal expansion coefficient in the range from $-40 \times 10^{-7}/°$ C. to $-95 \times 10^{-7}/°$ C. in the temperature range of $-40°$ C. to $+85°$ C.

FIG. 1 shows an athermalized optical waveguide device 19 that includes an optical waveguide fiber Bragg grating 22 attached to negative thermal expansion substrate 20. Optical waveguide 22 is attached under tension to substrate 20 with attachment members 24 such that when the temperature of the device and its surroundings increases, substrate 20 shrinks and releases tension on optical waveguide fiber Bragg grating 22 to compensate for optical changes caused by the increased temperature of optical waveguide 22. Attachment members 24 are preferably glass frit fusion seals and securement members 26 are epoxy seals which further secure the movement of fiber 22 relative to substrate 20 and members 24.

Preferably the dimensional length of the glass-ceramic body changes less than 32 ppm, more preferably less than 16 ppm, when exposed to the optical waveguide deployment environment. The saturated subcritical crack growth third length is a third state length longer than a second state deployment environment second length, in that a non-deployed non-crack-driven provided glass ceramic is in a first state with first state non-propagated microcrack lengths which transform into a second state with second state deployment environment propagation lengths when exposed to the optical waveguide deployment environment with the first state lengths less than the second state lengths which are less than the third state lengths. Preferably the glass-ceramic body has a stabilized elastic modulus when exposed to the optical waveguide deployment environment in that the elastic modulus of the glass-ceramic body changes less than 17% when exposed. Additionally the glass-ceramic body has a stabilized negative thermal expansion when exposed to the optical waveguide deployment environment in that the coefficient of thermal expansion in the range from $-40°$ C. to $+85°$ C. changes less than $4 \times 10^{-7}/°$ C. when exposed. The saturated subcritical crack growth length is long enough such that the saturated subcritical crack growth length does not substantially increase when exposed to the optical waveguide deployment environment. The saturated subcritical crack grown microcracks preferably terminate with a crack tip which is substantially filled with a percipitant of glass-ceramic constituents leached from the surrounding glass-ceramic. This percipitant of leached glass-ceramic constituents inhibits the growth of the microcracks and beneficially stabilizes the properties of the glass-ceramic by preventing further propagation or changes of the microcracks.

The invention further includes a negative thermal expansion substrate for athermalizing an optical waveguide device with the substrate including a microcracked negative thermal expansion glass-ceramic body having a plurality of microcracks terminating with a crack tip, wherein the microcrack crack tips are substantially filled with a percipitant of glass-ceramic constituents leached from the glass-ceramic body. Preferably the glass-ceramic body has a change in dimension less than 32 ppm when exposed to the deployment environment of the optical waveguide device. Preferably the glass-ceramic is a beta-eucryptic aluminosilicate glass-ceramic and the percipitant of glass-ceramic constituents are leached out and percipitated by exposure to a humid environment wherein water selectively condenses proximate to the small radius dimensions of the crack tips.

The microcracked beta-eucryptic glass ceramics of the invention have a strong negative thermal expansion that is particularly beneficial for passive athermalization of optical waveguide devices such as fiber Bragg gratings. The negative expansion characteristics of the beta-eucryptic glass-ceramic is enabled by extensive microcracks in their glass-ceramic that occur above a critical grain size. The beta-eucryptic crystals have a highly anisotropic thermal expansion behavior. Controlling these microcracks permits the tailoring of the thermal expansion and other properties of the microcracked negative thermal expansion glass ceramic bodies for use as optical waveguide athermalizing substrates. The beta-eucryptic ($LiAlSiO_4$) crystals utilized in the invention have anisotropic thermal expansion characteristics of $-18 \times 10^{-6}/°$ C. parallel to the C-axis and $8 \times 10^{-6}/°$ C. perpendicular to the c-axis with a bulk thermal expansion of $-1 \times 10^{-6}/°$ C. Extensive micro-cracking occurs in the glass-ceramic when the crystals are above a critical grain size of 5 $\mu$m, and are preferably from 5 to 10 $\mu$m. The microcracks contribute to a bulk negative thermal expansion of the glass-ceramic that may be tailored between $-4$ to $-9 \times 10^{-6}/°$ C.

In addition to the negative thermal expansion, the optical waveguide athermalization substrate must have long term dimensional stability so that it can be utilized in optical waveguide devices. In addition to long term stability of properties like coefficient of thermal expansion and physical dimensions (dimensional stability) such length, width, height, the substrate should have stabilized elastic modulus properties and strength properties. In addition to monitoring the wavelength operating optical properties of an assembled waveguide device, resonant ultrasound spectroscopy (RUS) provides a beneficial means for monitoring, measuring, and obtaining such properties. Resonant ultrasound spectroscopy (RUS) is described in J. Maynard, "Resonant Ultrasound Spectroscopy" *Physics Today*, Vol. 49, p.26–31 (1996).

It is believed that the energy to propagate microcracks in these negative thermal expansion glass-ceramics which contain such thermal expansion anisotropy crystals arises from the accumulation of strain mismatch upon cooling the glass-ceramics from their processing temperatures. This strain energy may be released as microcracks which are initiated and propagated. Microcrack propagation stops when the energy available for propagation drops below the energy required. Although the microcracks may appear to have stopped growing, sufficient residual strain energy is most likely available to propagate cracks under subcritical conditions in various environments. Subcritical microcrack growth behavior is an important element related to stabilizing microcracked beta-eucryptite glass-ceramics.

It is believed that sealing of crack tips of lengthened microcracks is beneficial and that such sealing of the crack tips preferably includes blunting all sharp crack tips. Such blunting may provide desirable stabilization of the beta-eucryptite glass-ceramic. In a preferred stabilization situation, the driving force for subcritical crack propagation, i.e., strain energy, is removed first. Left with sharp crack tips, a secondary sealing treatment to stabilize and blunt them is believed to be more desirable than leaving a sharp crack tip.

EXAMPLES

The invention will be further clarified by the following examples which are intended to be exemplary of the invention.

Figure 2:
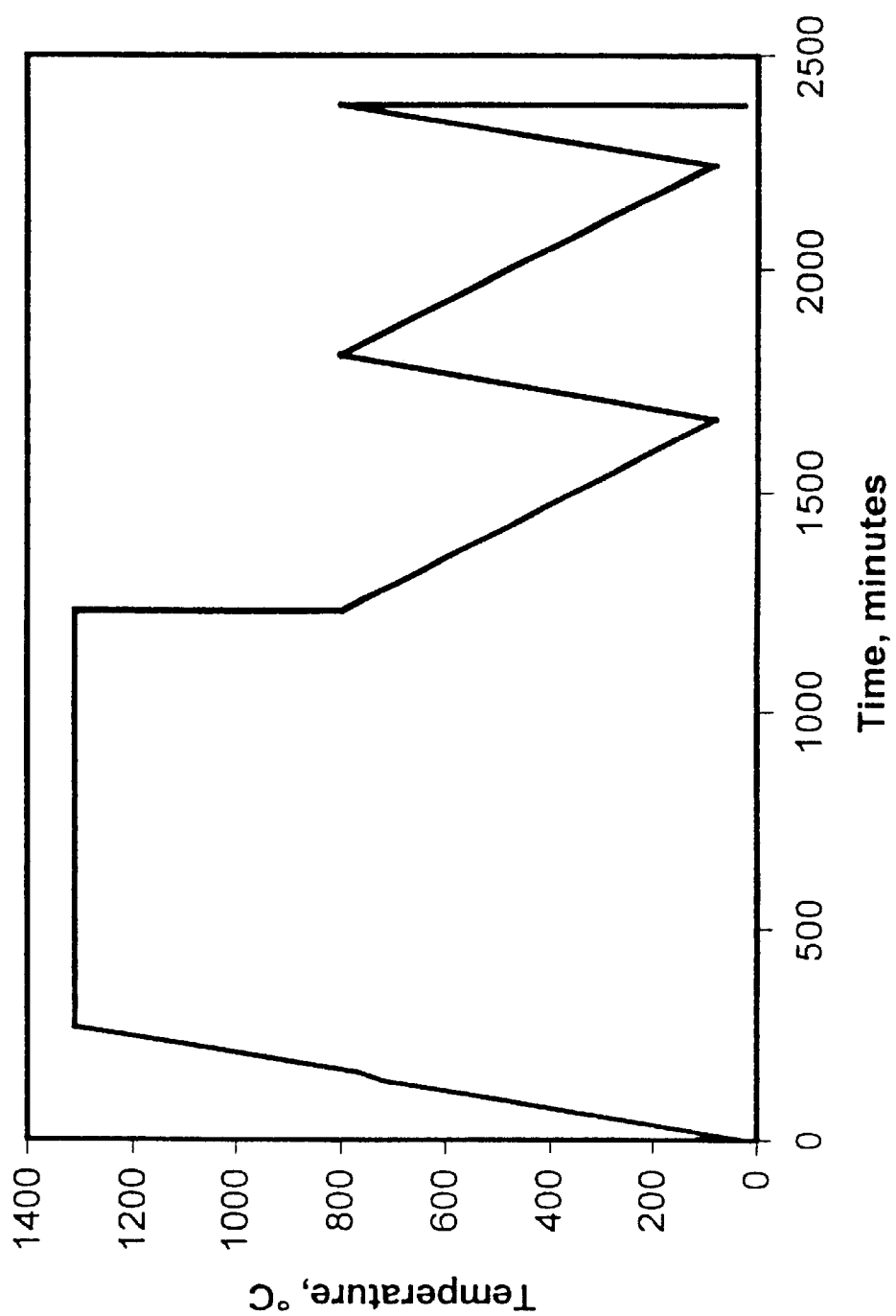
FIG. 2 is a plot of the ceramming schedule used for the preparation of beta-eucryptite in accordance with the Invention.

Beta-eucryptic glass-ceramic specimens were made from a glass composition of 48.7 wt. % $SiO_2$, 37.8 wt. % $Al_2O_3$, 9.7 wt. % $Li_2O$, and 3.8 wt. % $TiO_2$ (8.5 wt. % $Al_2TiO_5$), from which beta-eucryptite specimens were made. Substrate specimens on which modulus measurements were made were cut into rectangular parallelepipeds with nominal dimensions of 6×8×10 mm. Strength measurements were made on substrates with preferred optical waveguide device substrate dimensions of 51×4×2 mm and frequency measurements were made on substrates with dimensions of 51×4×2 mm or 75×4×2 mm. The nominal firing schedule for ceramming the glass and forming the beta-eucryptite glass-ceramic is shown in FIG. 2.

Elastic modulus measurements were used to study this microcracked glass-ceramic material since they are simple to make and extremely sensitive to small changes in properties. Elastic modulus was measured using resonant ultrasound spectroscopy (RUS). The rectangular parallelepipeds with dimensions of 6×8×10 mm were ideal for elastic modulus measurements, thus, elastic modulus values were calculated for these specimens. However, elastic modulus was found to vary somewhat from specimen to specimen, therefore, elastic moduli were normalized to the initial value for each specimen for easier interpretation and comparison.

Short term elastic modulus measurements were used to determine the behavior of the beta-eucryptite glass-ceramic in various water containing environments. For these measurements, each of the specimens were taken out of the furnace at the end of the ceramming cycle and immediately measured for modulus and then placed in the respective environments. It was this first measurement that all subsequent measurements were normalized to. Data obtained at 0, 75.3, 93.6, 97.3 and 100% relative humidity (r.h.) were each obtained on a single specimen and measured in their respective environments. Modulus measurements for exposure to deionized water were obtained on multiple specimens. This was done since accurate modulus measurement cannot be made in the presence of liquid water and each measurement required drying of the specimen. Although this procedure, using multiple specimens, generated more scatter in the results than repeated measurements on the same specimen, it eliminated concerns regarding repeated drying cycles that would have been necessary to use a single specimen. Long term modulus measurements were executed in the same manner, however, their purpose was to determine the effectiveness of stabilization treatments, thus, the initial modulus measurement to which all subsequent data were normalized to was obtained after the stabilization treatments but before exposure. The environments used for exposure were all at 22° C. with 0, 52.9, 75.3, 90, 93.6, 97.3, and 100% r.h.

Elastic modulus was not determined on the longer substrates due to difficulties in identifying appropriate modal vibrations from the resonant spectrum. Certain peaks in the spectrum were reproducible and able to be tracked, thus, changes in modulus could be implied since $$E = kf^2 \qquad \text{(Equation 1)}$$

where E is elastic modulus and f is the resonant frequency and k is a constant that depends on the specimen mass, geometry, and resonance mode.

The strength of the beta-eucryptite glass-ceramic substrates was measured on a universal testing machine in 4 point bending with inner and outer spans of 20 and 40 mm and a displacement rate of 0.05 inches per minute.

Figure 3:
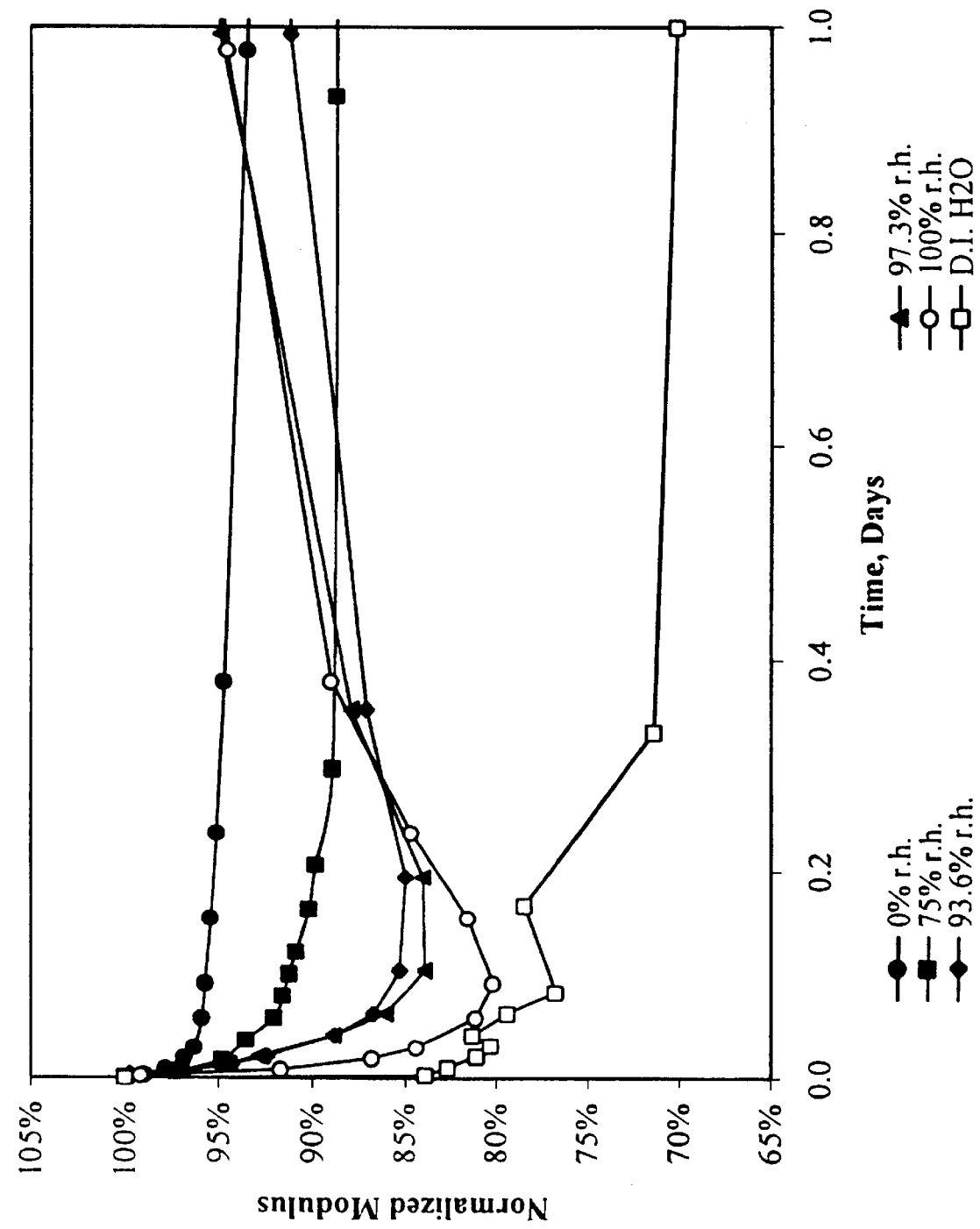
FIG. 3 is a graph of Normalized Modulus (y-axis) versus Time in Days (x-axis) in various environments for short periods of time of beta-eucryptic glass-ceramics after a ceramming heat reatment cycle of 1300° C. for 16 hours and two cycles to 800° C.

FIG. 3 plots normalized elastic modulus in various environments ranging from 0% r.h. to submerged in deionized (D.I.) water at 22° C. for a period of 1 day. At 0% r.h., modulus shows a decelerating decrease to about 95% of its original value after 1 day. Increasing the humidity level to 75% increases the initial rate of modulus decrease. At 93.6, 97.3 and 100% r.h., modulus rapidly decreases their respectively lower minimums. In these three high humidity environments, instead of remaining in a decreasing trend, the modulus begins to increase after an exposure of approximately 2 hours. The rate of modulus recovery also appears to increase with increasing humidity. Submerging specimens in deionized water shows the largest and most rapid modulus decrease to about 70% of original. However, no modulus recovery was observed in this submerged condition.

Figure 4:
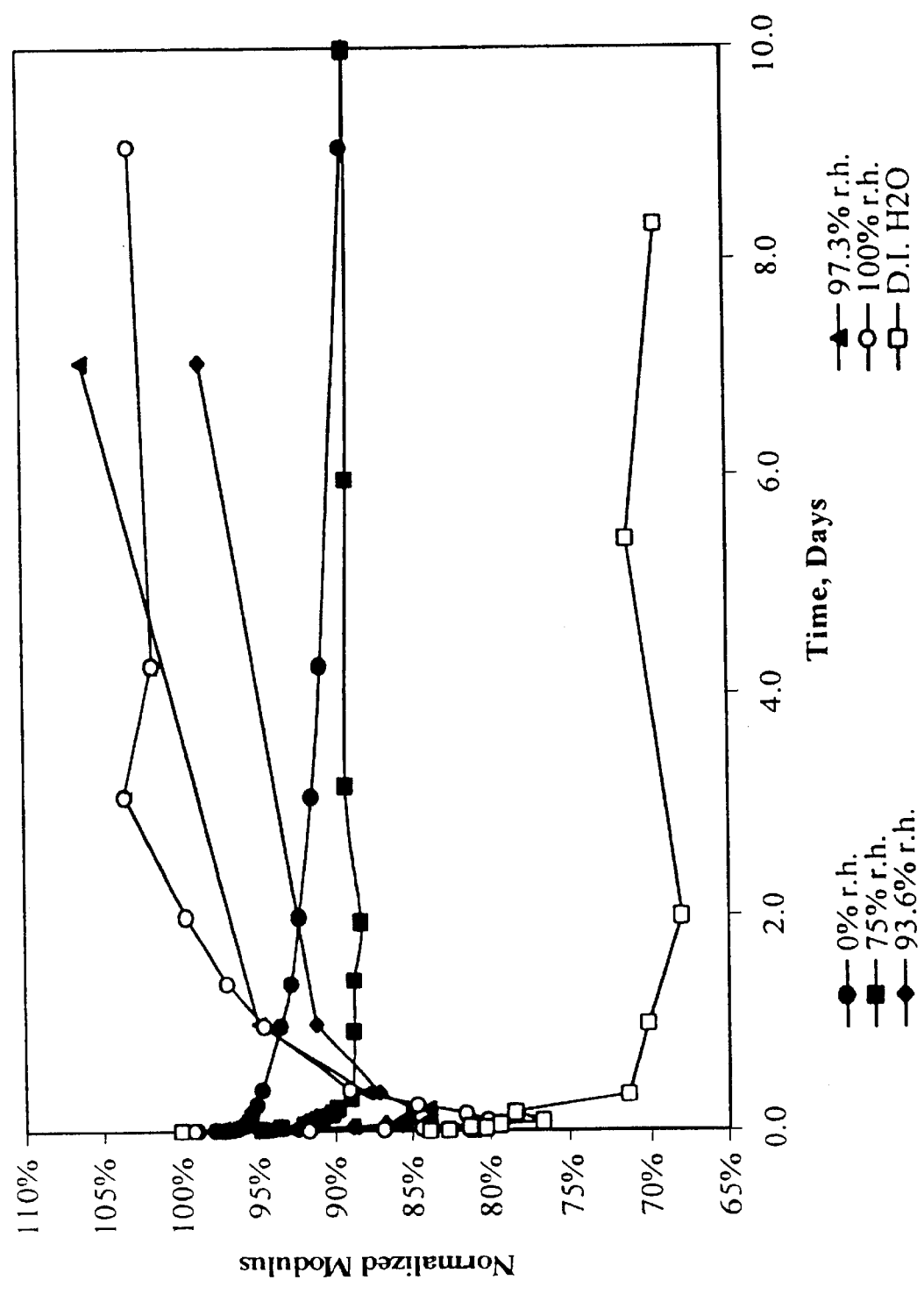
FIG. 4 is a graph of Normalized Modulus (y-axis) versus Time in Days (x-axis) in various environments for up to 10 days of beta-eucryptic glass-ceramics after a ceramming heat reatment cycle of 1300° C. for 16 hours and two cycles to 800° C.

FIG. 4 presents data on the same specimens as FIG. 3, however, the time axis is extended to 10 days. Viewing this time span, the 0% and 75% r.h. conditions seem to be approaching the same level of elastic modulus decrease at 88%. The specimens submerged in deionized water appear to have a maximum decrease of 70% that was reached after an exposure of approximately 8 hours. In general, the rates of modulus decrease and level of decrease both increased with increasing amounts of water in the environment. The modulus of the specimen exposed to 100 and 97.3% r.h. increased beyond their original values and at 93.6% r.h. the modulus almost reached its original value.

Figure 5:
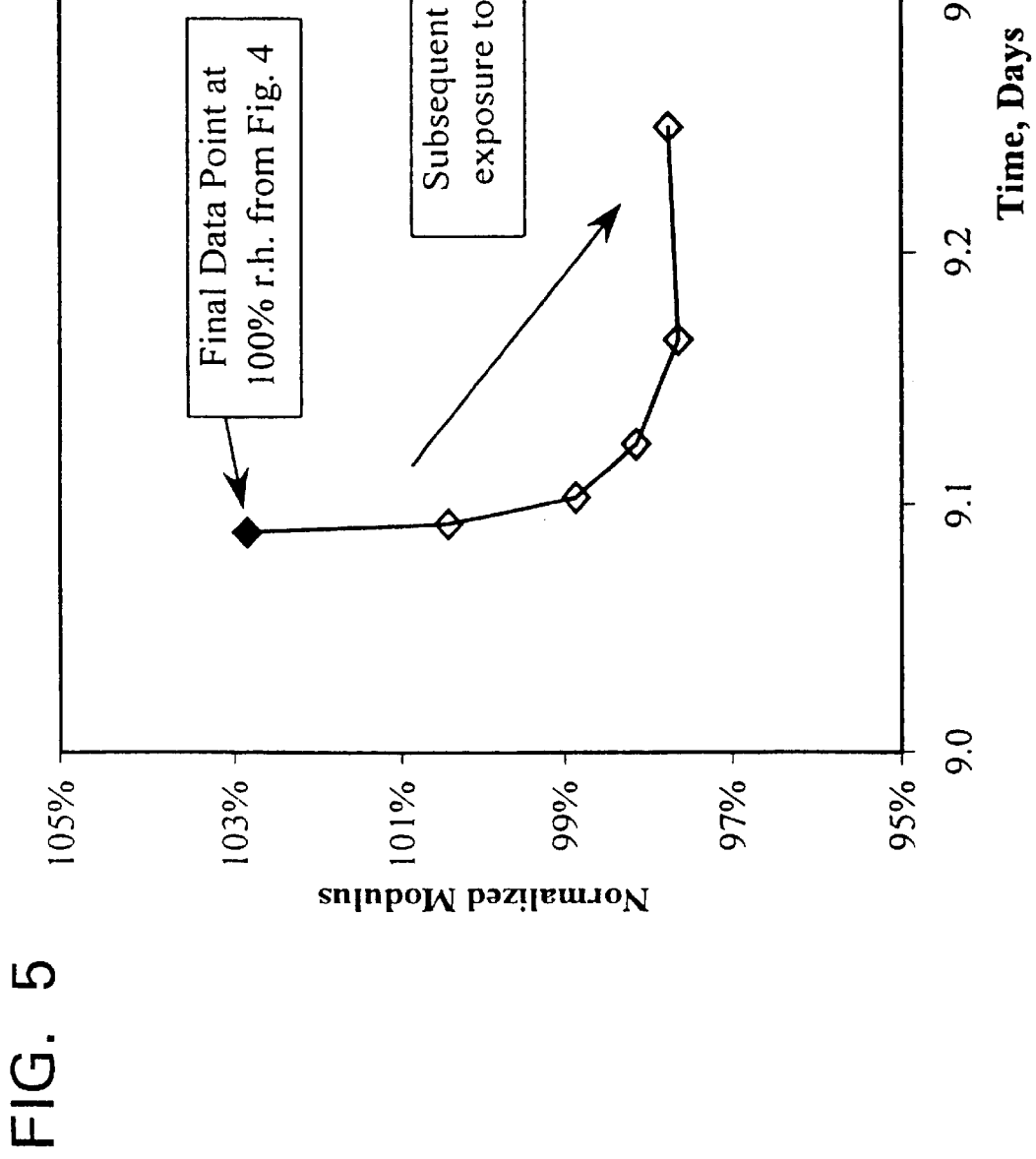
FIG. 5 is a graph of Normalized Modulus (y-axis) versus Time in Days (x-axis) of beta-eucryptite glass-ceramic in ambient conditions (~50% r.h.) after 9 days exposure to 100% r.h.

Elastic modulus measurements made on the specimen in the 100% r.h. environment were halted after 9 days as indicated in FIG. 4. Curiosity regarding the large increase in modulus instigated a second set of measurements on this specimen. This specimen was removed from the 100% r.h. and measured at ambient conditions (~50% r.h). These measurements are plotted in FIG. 5. Note the change of scale compared to FIG. 4, however both are continuous. Clearly seen is a drop in modulus by about 5%. Another observation is that modulus measurements were difficult to make in 100% r.h. due to the large width of the resonance peaks. Under exposure to lower humidity ambient conditions the peaks narrowed over time, for the data shown in FIG. 5, making modulus measurements easier, however, peak widths were not quantitatively measured.

Figure 6:
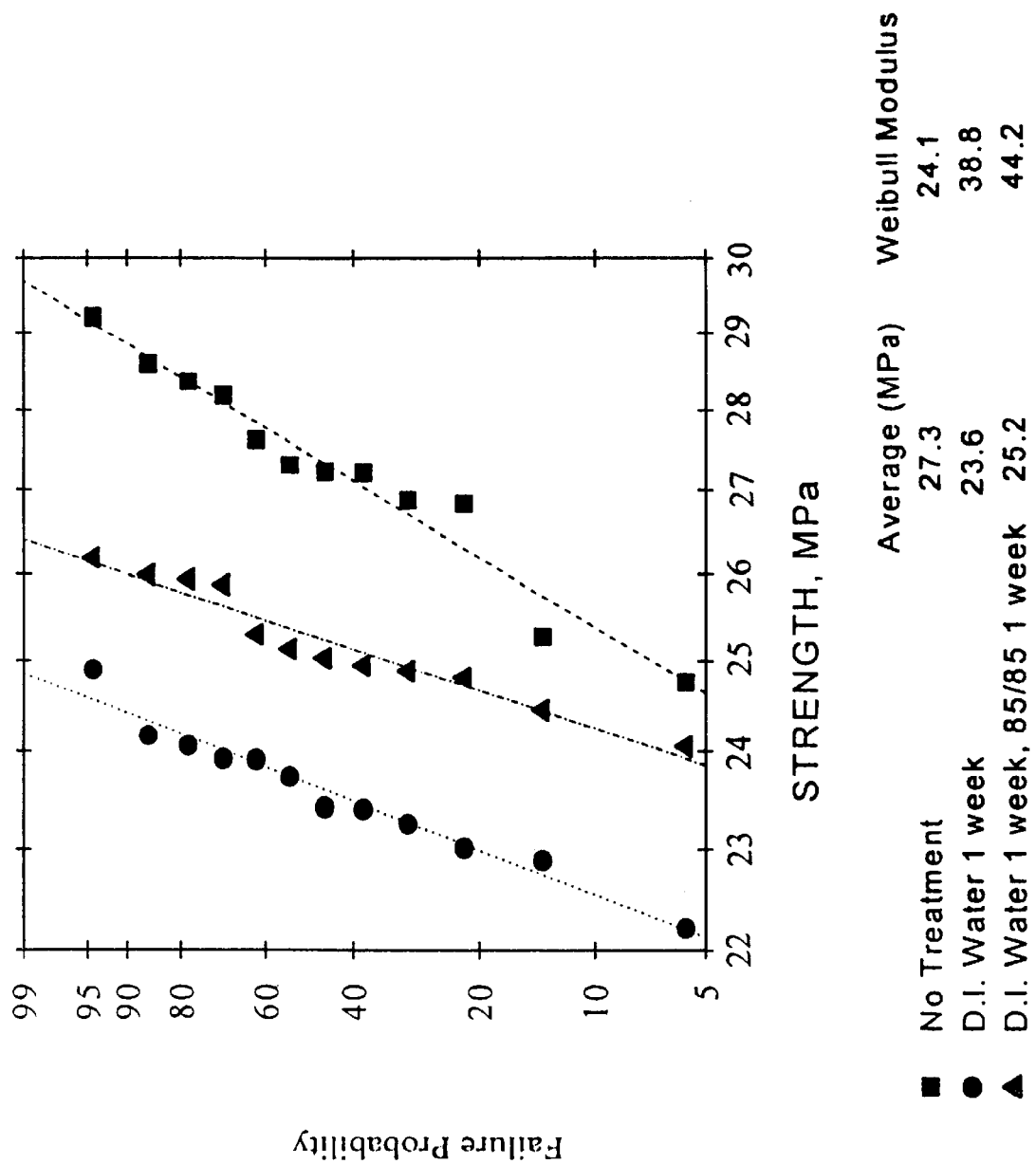
FIG. 6 is a plot of Weibull distributions of strength of beta-eucryptic glass-eramic substrates after various water treatments (failure probability—y-axis; strength-Mpa—x-axis)
Figure 7:
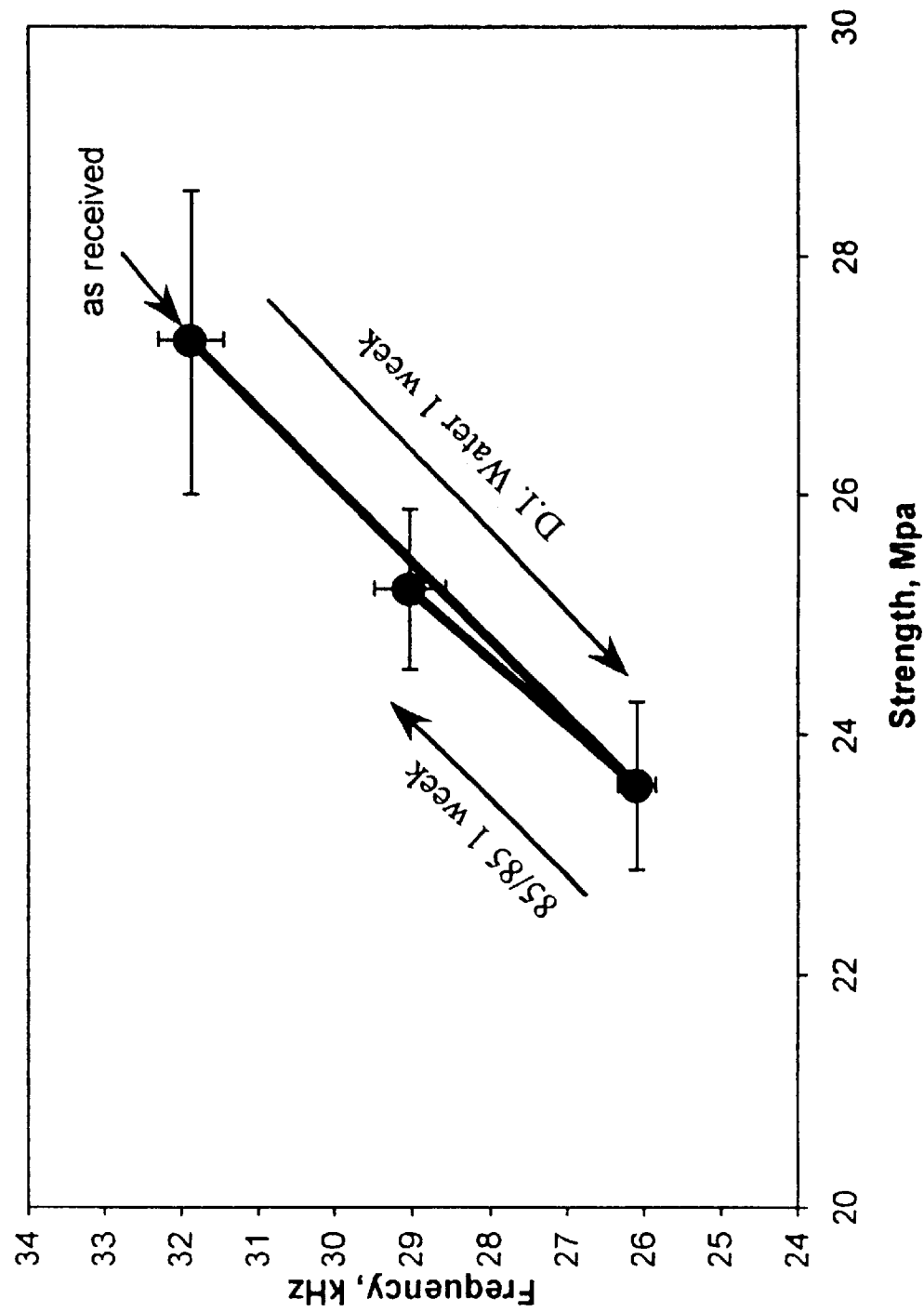
FIG. 7 is a plot of a flexural Resonance Frequency (kH$_z$) (y-axis) versus Strength (Mpa) (x-axis) of beta-eucryptic glass-ceramic substrates after various water treatments.

Strengths of the beta-eucryptite glass-ceramic substrates with three treatments (none, D.I. water 1 week, and D.I. water 1 week −85° C./85% r.h. 1 week) are shown in FIG. 6 in the form of a Weibull plot. The Weibull modulus or "slope", a measure of the scatter in the data, is extremely high indicating very little scatter. Clearly evident in this plot is the decrease in strength from 27.3 MPa to 23.6 MPa after exposure to D.I. water for 1 week. A second week in 85° C./85% r.h. following the D.I. water exposure increased the strength from 23.6 to 25.2 MPa. FIG. 7 plots this same strength data along with corresponding frequency data that is a measure of modulus according to Equation 1. Scatter bars represent one standard deviation. Clearly shown in FIG. 7 is that both modulus and strength decrease with exposure to D.I. water and then increase with subsequent exposure to 85° C./85% r.h.

Figure 8:
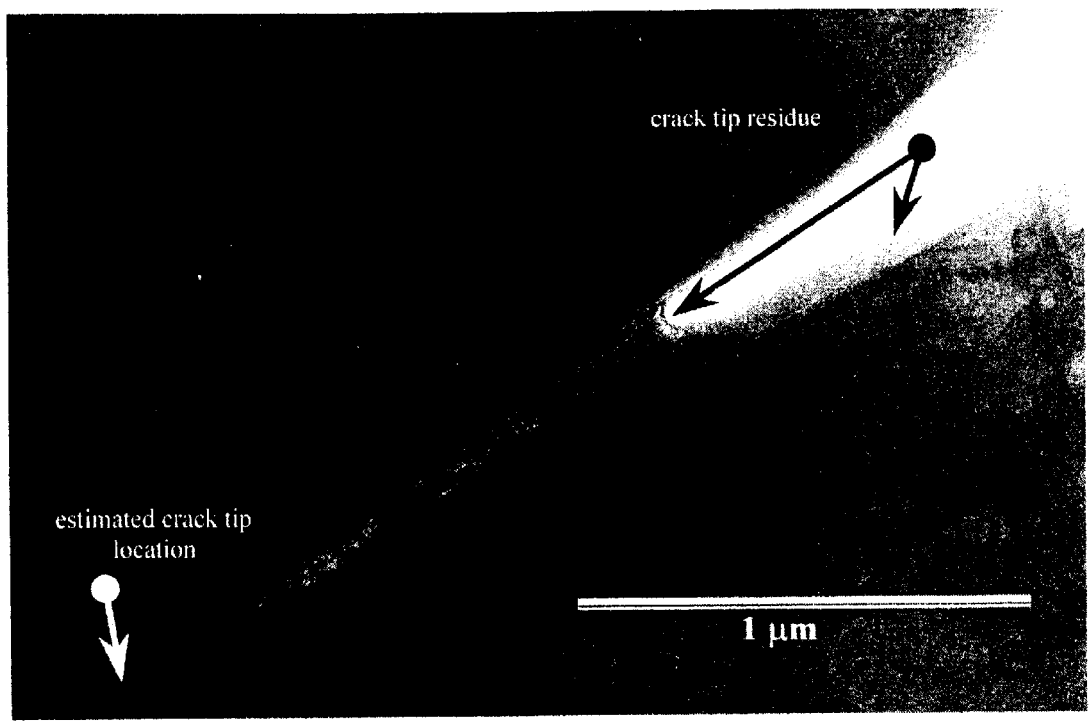
FIG. 8 is a TEM photo-micrograph of a micro-crack in beta-eucryptic glass-ceramic exposed to 100% r.h. at 22° C. for one week.

A TEM (transmission electron microscope) photomicrograph image of a single micro-crack in the beta-eucryptite glass ceramic is shown in FIG. 8. Prior to preparation for microscopy, this specimen was exposed to 1 week at 100% r.h. and 22° C. The position of the crack tip in this image, estimated by tracing the crack faces with a straight line, is indicated by a single arrow. The double arrow indicates a boundary formed by the edge of a residue between the crack surfaces. Elemental analysis indicates the presence of Si and Al in this residue in reverse proportions to which they are found in the glass-ceramic matrix. Li cannot be detected by this technique. This image indicates that this micro-crack has been filled in (shortened) by approximately 1.5 $\mu$m.

A strong correlation ($R^2 \sim 0.9$) between resonant frequency and CTE has been found. Correlation is presented in FIG. 9 for the longer 75 mm substrates. To obtain frequency measurements for this correlation on these longer substrates, alterations in specimen mounting were required. Measurements of shorter substrates were made with the RUS transducers contacting two corners of the substrate that were connected by the body diagonal. This mounting was extremely difficult with the longer 75 mm substrates. For the FIG. 9 correlation, the 75 mm substrates were placed on top of the two transducers, forcing flexural vibrations. Thus, for the data in FIG. 9, the vibrational mode is known.

Figure 9:
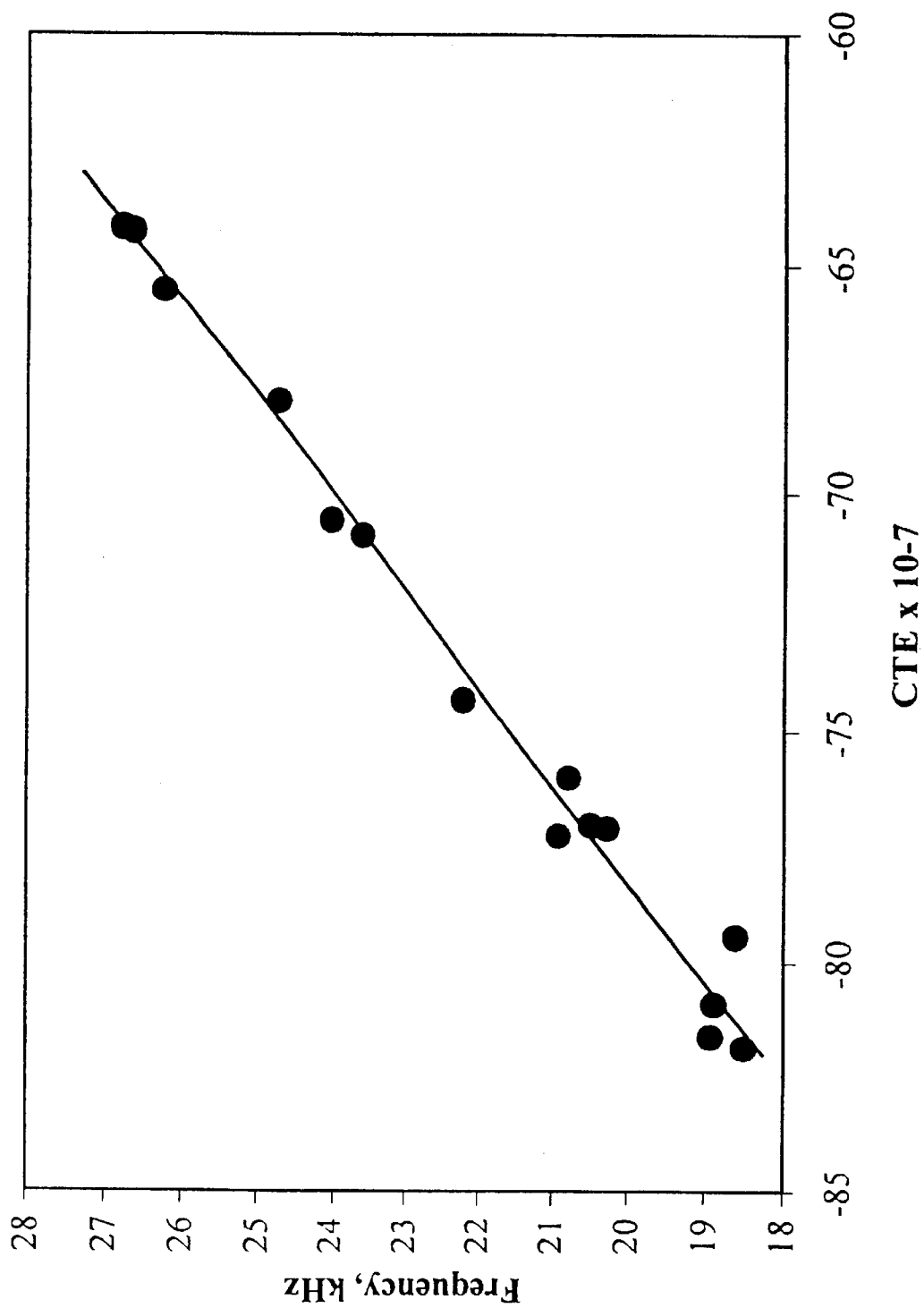
FIG. 9 is a correlation plot of a flexural resonant Frequency (kH$_z$) (y-axis) versus CTE ($\times 10^{-7}$) in beta-eucryptic glass-ceramic substrate (dimensions of 75 mm×4 mm×2 mm)

In FIG. 9 the correlation is much stronger with $R^2=0.99$. The equation of this correlation is given below.

$$CTE, 10^{-7}/°C.=2.07(freq, kHz)-120 \quad \text{(Equation 2)}$$

According to the correlation in FIG. 9, a frequency measurement can predict the CTE to approximately $+/-1.7 \times 10^{-7}/°$ C.

Figure 10:
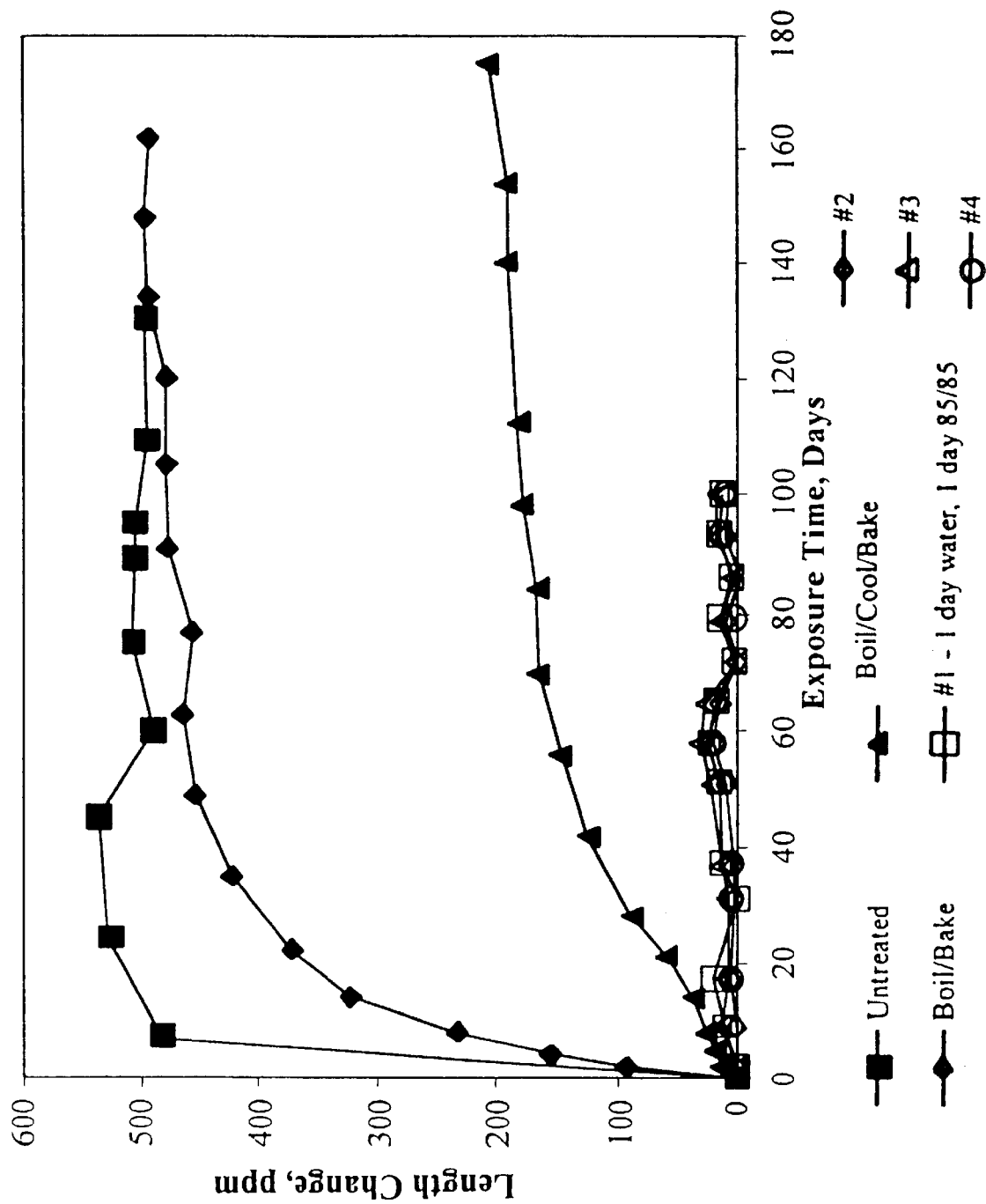
FIG. 10 is a plot of a Length Change (ppm) (y-axis) versus Exposure Time in Days (x-axis) of four inch long beta-eucryptite bars with various stability treatments after exposure to 22° C./100%r.h.
Figure 11:
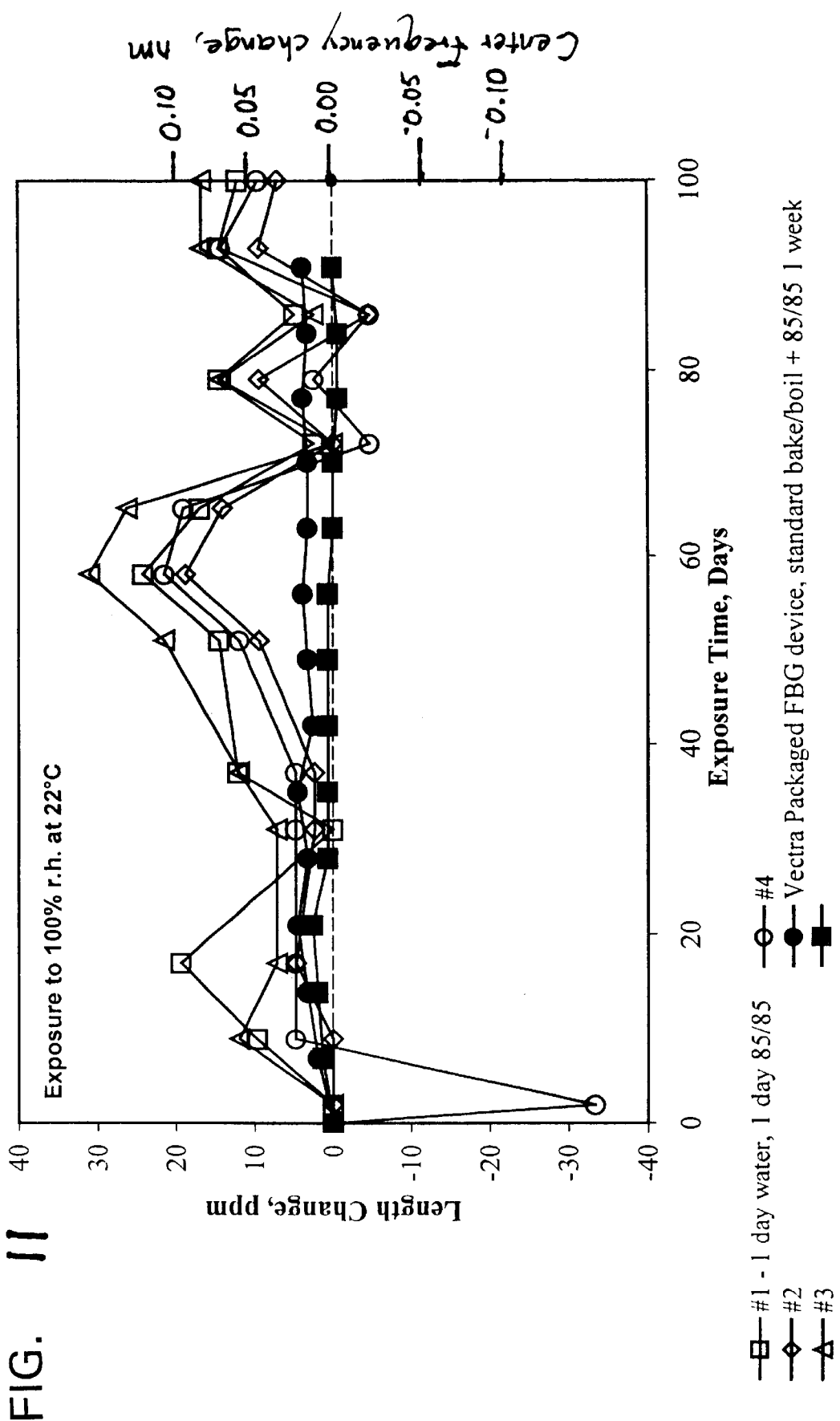
FIG. 11 is a plot of data from FIG. 10 with the y-axis of Length Change (ppm) expanded to focus on the beta-eucryptite glass-ceramic bars pre-treated with one day in water and one day in 85° C./85% r.h. and exposed at 22° C./100 r.h. and x-axis Exposure Time in Days (hollow data points), and also showing the Center Frequency Change of two sample fiber Bragg grating devices using beta-eucryptite substrates to achieve low Center Frequency Change in a Vectra (non-hermetic) package (solid data points)

FIG. 10 illustrates length stability. Untreated beta-eucryptite glass-ceramics shows a rapid increase in length of approximately 500 ppm in the first few days after, which it appears to stabilize. Beta-eucryptite glass ceramics treated with a 4 hour boil in water followed by a 16 hour dry at 200° C. (Boil/Bake) still shows an increase of approximately 500 ppm but take several weeks to reach this level. A boil, cool down, and bake treatment (4 hour boil, cool in water to room temperature and hold in the water for 48 hours then dry for 16 hours at 200° C.) (Boil/Cool/Bake) appears to slow the length increase even further than the plain boil. A third treatment of submerging in room temperature water for 1 day followed by 85/85 for 1 day and dried at 100° C. for 16 hours, shown by the open symbols on bars #1, #2, #3, and #4 show almost no length change. FIG. 11 shows the same data for these 4 bars (#1, #2, #3, #4) (hollow data points) with an expanded y axis. FIG. 11 further show the performance of two fiber Bragg grating devices employing beta-eucryptite substrates of the type represented by bars #1, #2, #3, and #4. The fiber Bragg grating devices are Vectra (non-hermetic) packaged. Center Frequency Change is shown in nm for two samples (solid data points).

Figure 12:
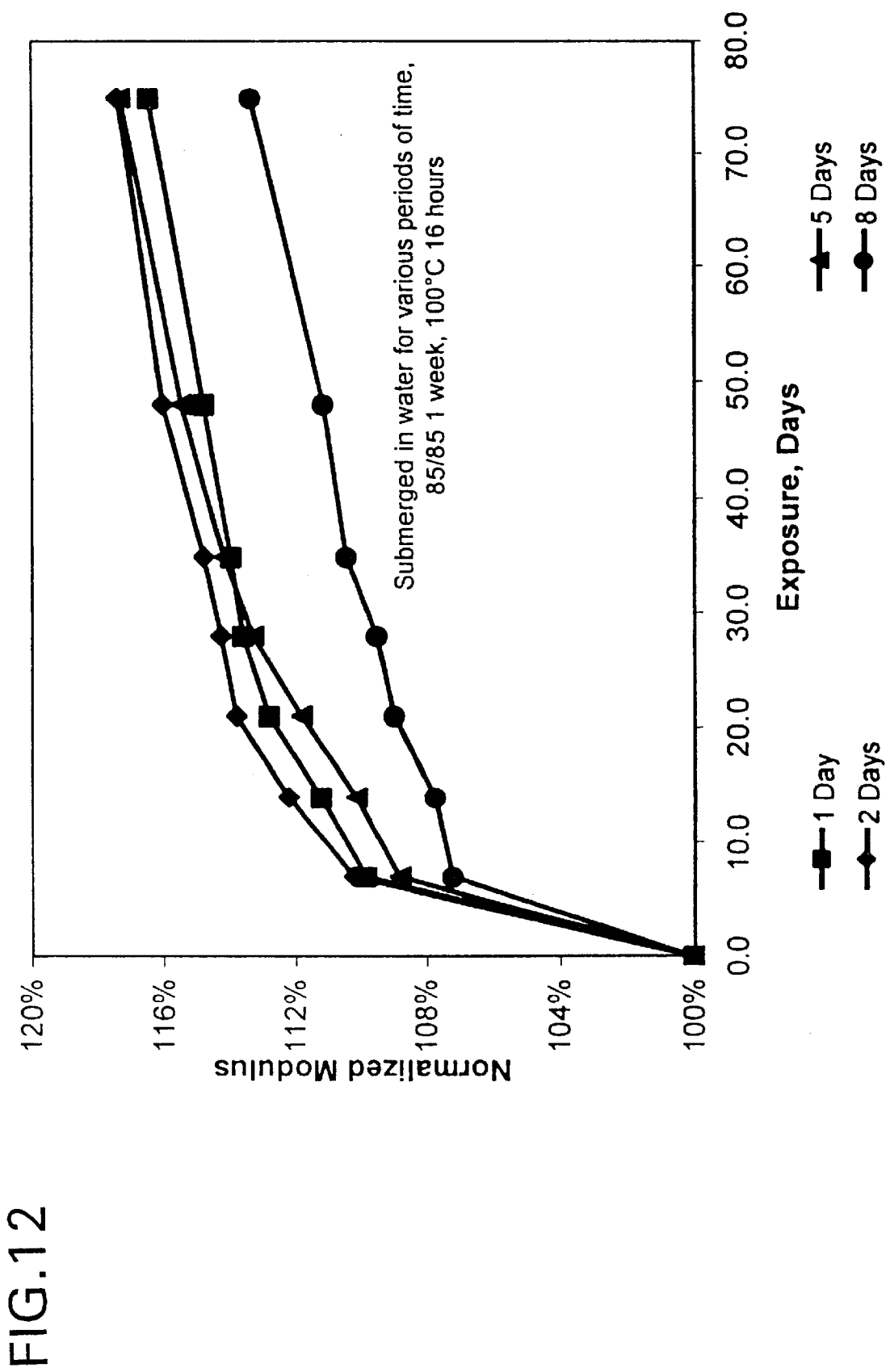
FIG. 12 is a plot of Normalized Modulus Increase (y-axis) of beta-eucryptite glass-ceramics exposed to 100% r.h. at 22° C. after treatments including various times submerged in water followed by one week exposure to 85° C./85% r.h. and 100° C. dry for 16 hours with the x-axis ExposureTime in Days.

Long term modulus measurements were also made after stabilizing treatments. FIG. 12 plots the modulus increase with exposure to 100% r.h. at 22° C. for 4 stabilization treatments. The treatments differed only in the amount of time specimens were submerged in water prior to a 1 week exposure to 85° C./85 r.h. and a 16 hour dry at 100° C. The various lengths of time are listed in the legend.

Figure 13:
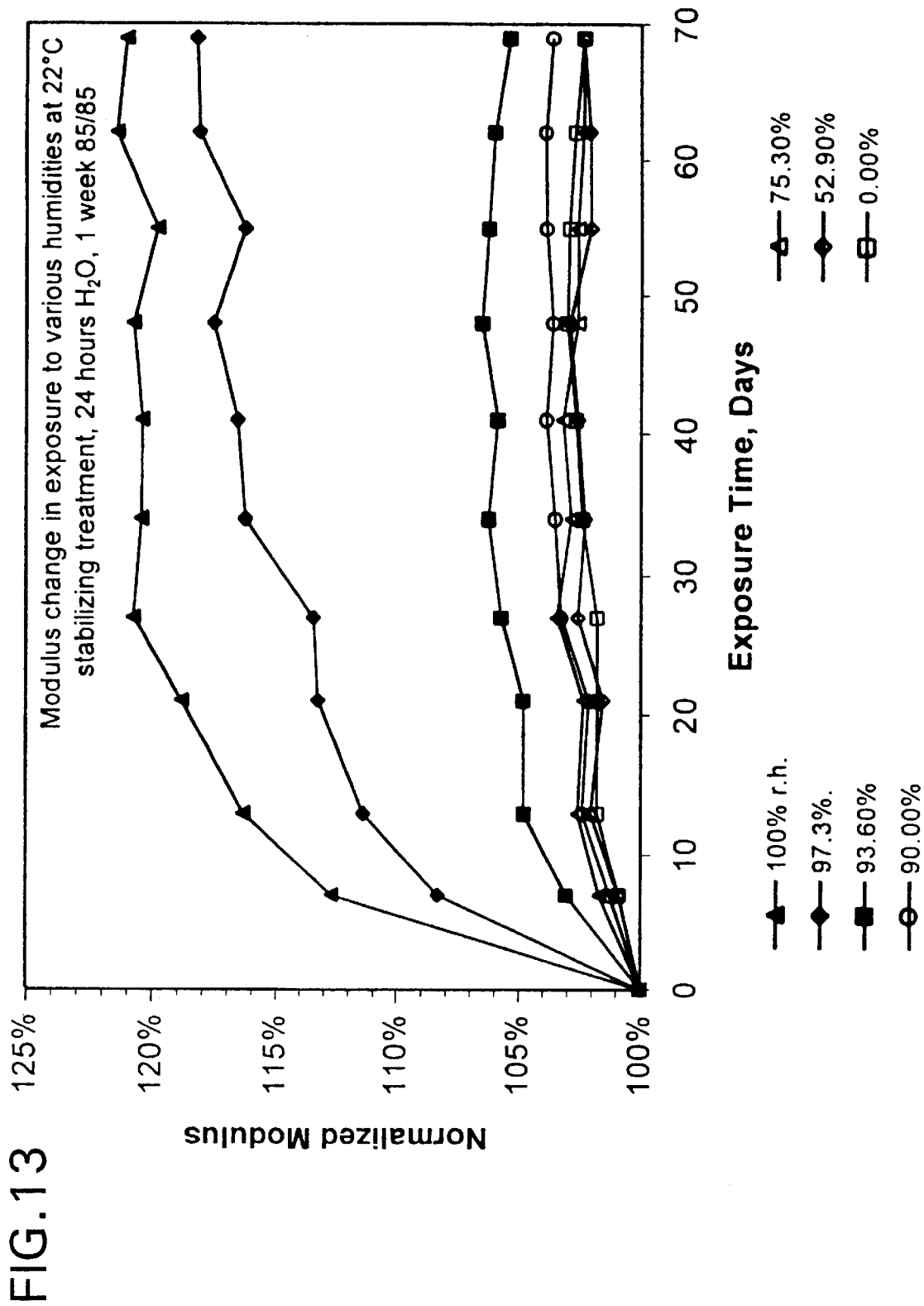
FIG. 13 is a plot of Normalized Modulus Increase (y-axis) of beta-eucryptite glass-ceramic exposed to various levels of humidity at 22° C. after stabilizing treatment of one day submerged in after followed by one week exposure to 85° C./85% r.h. and 100° C. dry for 16 hours with the x-axis Exposure Time in Days.

Modulus changes with exposure to various amounts of environmental humidity at 22° C. were observed using a single stabilization treatment of 1 day submerged in water at 22° C. followed by 85° C./85 r.h. for 1 week and a 16 hour dry at 100° C. These observations are shown in FIG. 13. As was seen in FIG. 12, the modulus initially increases rapidly then continues to increase at a lower rate. As the amount of moisture in the environment is decreased, the rate of modulus increase is reduced. Modulus increase for the maximum period of time observed from FIG. 13 is plotted in FIG. 14 as a function of relative humidity. When the humidity is increased above 90%, the modulus increases become significantly larger.

It is believed that two major mechanisms, subcritical crack growth and crack blunting, are responsible for much of the transient behaviors that have been observed in the beta-eucryptite glass-ceramic.

The stresses to drive microcracks in the beta-eucryptite glass-ceramic arise from the strong thermal expansion mismatch along the a and c axes as previously described. As polycrystalline beta-eucryptite glass-ceramic is cooled from its ceramming temperature, strains increase until enough is accumulated to propagate microcracks. For this specimen composition cerammed at 1300° C. this appears to occur at about 400° C.; as the temperature is cooled further, more strains are developed and microcracks continue to propagate. In the absence of moisture, the criterion for microcrack extension is that the stress intensity factor, $K_I$, is greater than the toughness of the material, $K_{IC}$. As the level of strain increases, so does the level of $K_I$. Thus, as microcracks extend and strain is relieved, K, will eventually drop slightly below $K_{IC}$, and the cracks will cease to grow. This is essentially the state of strain at the end of the ceramming cycle when it is removed from the furnace.

As such strained microcracks are exposed to environmental water, the microcracks begin to grow according to the subcritical crack growth relationship. Since crack velocities in a microcracked material such as the glass-ceramic are not easily measured, an alternate means was utilized. Modulus measurements were extremely useful in observing the effects of subcritical microcrack growth due to its high sensitivity and its non-destructive nature, allowing multiple measurements on the same specimen.

The Young's modulus of un-microcracked beta-eucryptite is approximately 17 Mpsi. This decreases to approximately 3-4 Mpsi with microcracking depending upon ceramming conditions and degree of grain growth. This modulus continues to drop after removal from the furnace as can be seen in FIG. 3. In all 6 environments with varying levels of water, the modulus initially decreases very rapidly and then the decrease eventually slows down. This is directly related to the microcrack growth. As the microcracks grow more slowly and eventually stop, the modulus also decreases more slowly and eventually stops.

Several relationships between microcracks and modulus have been developed, for example, Equation 3.

$$E = E_o\left(1 + \frac{16}{9}Nb^3\right)^{-1} \quad \text{Equation 3}$$

Where $E_O$ is the modulus of the un-microcracked body, E is the modulus with microcracks, N is the number density of microcracks and b is the effective crack radius.

The level of microcracking in beta-eucryptite is significantly more severe. Assuming a crack length of 12.5 $\mu$m in beta-eucryptite, giving b=6.75 $\mu$m, the number density, N is calculated to be $7.06 \times 10^{15}/m^3$.

A reasonable assumption to make regarding the behavior of these microcracks is that their number density, N, remains constant for events near ambient conditions. Based on this assumption and Equation 3, the modulus data in FIG. 3 and FIG. 4 are replotted in terms of microcrack extension in FIG. 15 and FIG. 16. The first derivative of FIG. 15 and FIG. 16 yields the microcrack velocities.

The stability of beta-eucryptite glass-ceramic is dependent upon the behavior of the microcracks. Thus, it is desirable that the microcracks are lengthened such that the strain energy available to drive them is completely relieved. This essentially defines the equilibrium position of the crack tip.

Figure 15:
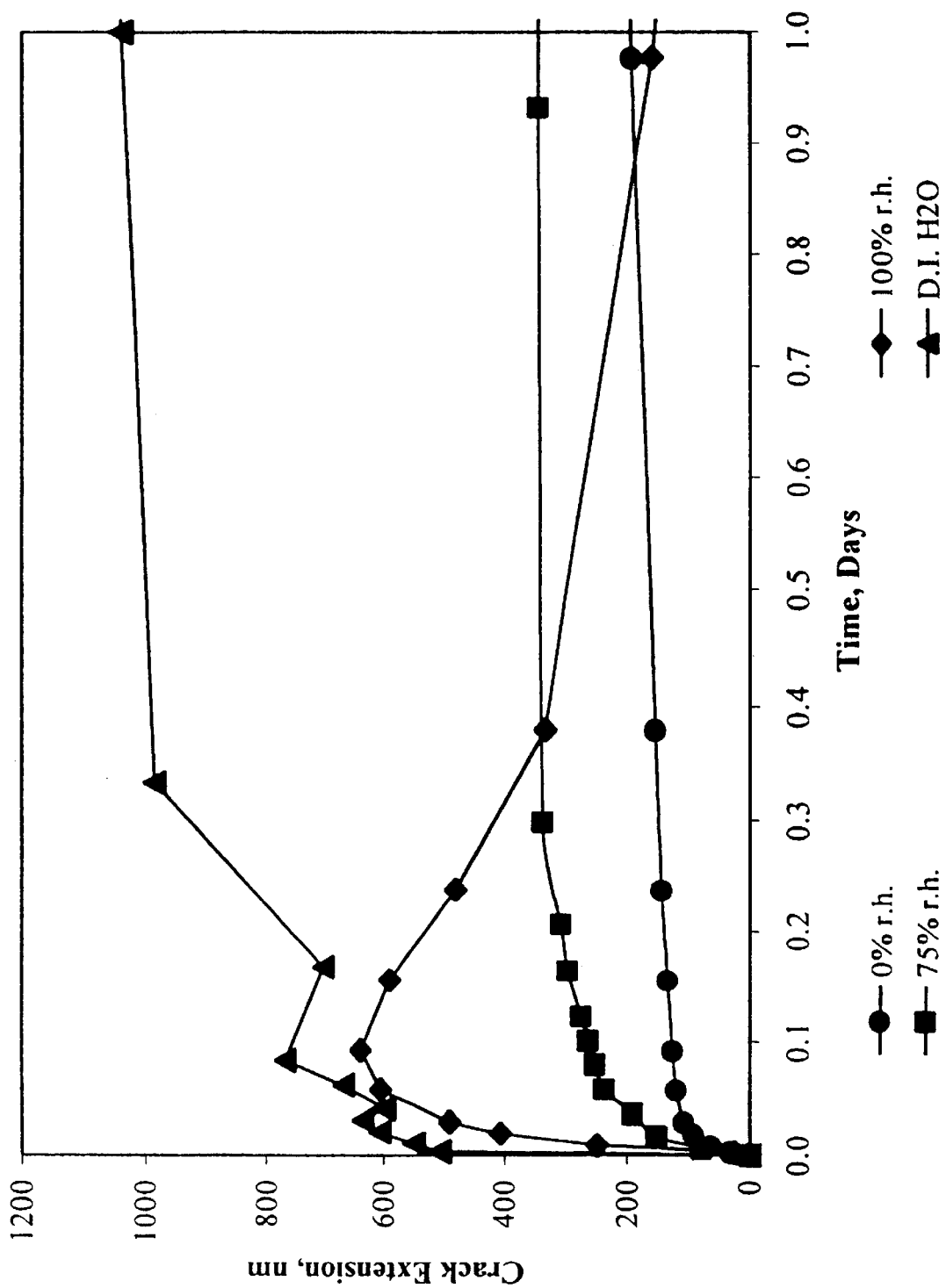
FIG. 15 is a plot of Crack Extension, nm (y-axis) in various environments calculated from FIG. 3 based on constant crack density assumption and Equation 3 versus Time in Days (x-axis)
Figure 16:
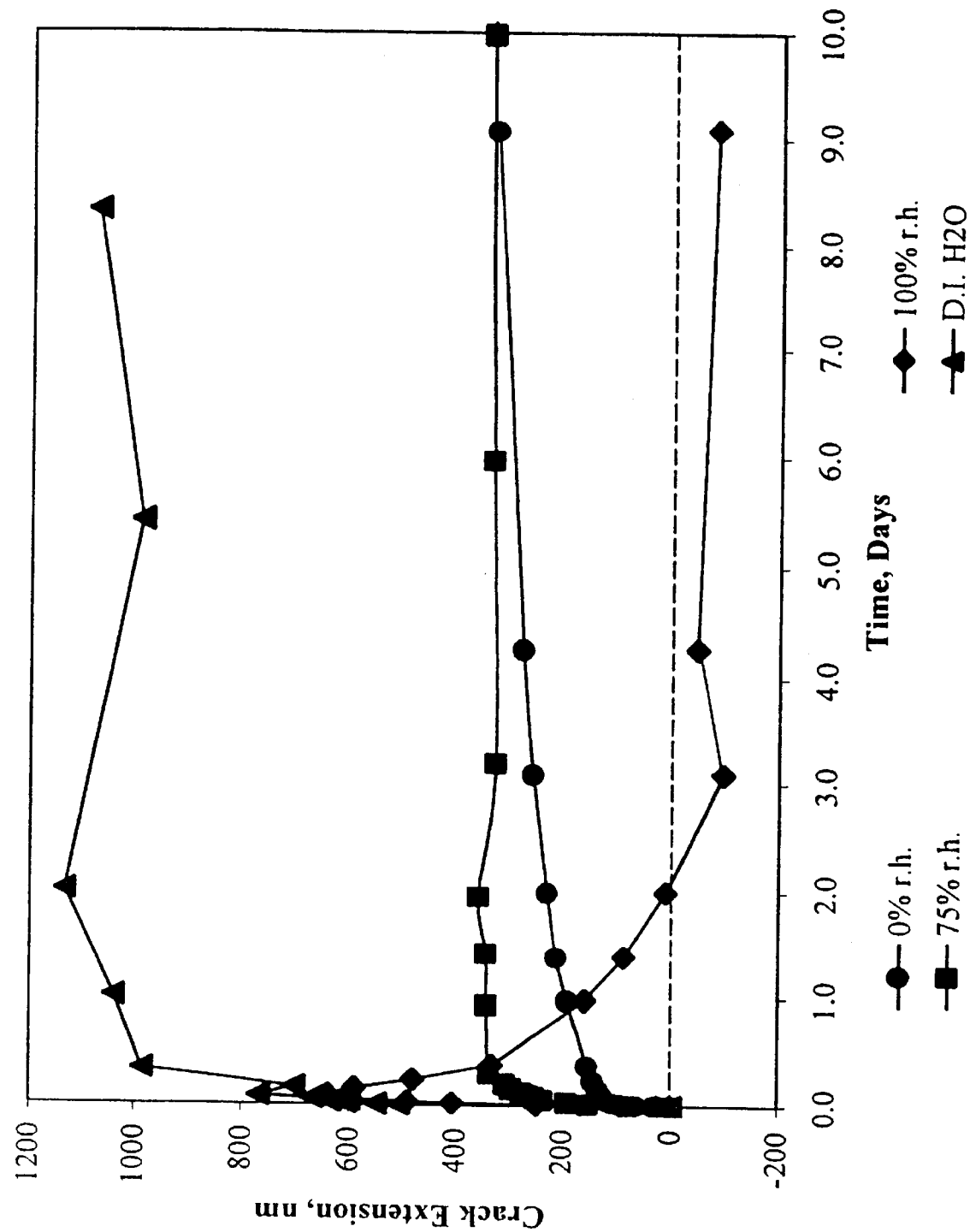
FIG. 16 is a plot of Crack Extension, nm (y-axis) in various environments calculated from FIG. 4 based on constant crack density assumption and Equation 3 versus Time in Days (x-axis).

These two topics are factors that affect crack growth kinetics are water, crack tip stress, and temperature. FIGS. 15 and 16 show that with increasing levels of environmental water, the initial crack velocity increases. FIGS. 15 and 16 also show that with increasing time the crack velocities of each curve are shown to decrease. This decrease is a result of crack tip stresses being relieved, thus the stresses to drive the cracks become smaller. Thermal expansion anisotropy of beta-eucryptite results in crack tip stresses increasing with decreasing temperatures, thus, the crack growth kinetics may increase with decreasing temperature.

The kinetics simply determine how fast crack growth occurs. The equilibrium position of the microcrack is determined by stresses at the crack tip. With these tests being conducted at the same temperature the stress resulting from the thermal expansion anisotropy is essentially the same for all specimens. Thus, assuming that thermal anisotropy is the only source of stress, one would expect that the equilibrium crack position would be the same under various concentrations of environmental water.

FIG. 16 indicates that the equilibrium crack tip position is independent of water concentration only at low humidities. In a desiccator and at 75% r.h. crack extension appears to approach the same level after 10 days. Such a desiccator is not zero humidity, but determined by how much water entered the chamber when initiating the test, the rate of water absorption by the desiccant and its equilibrium vapor pressure. For present purposes here this condition can be defined only as very low humidity. When the humidity is increased to 93.6, 97.3, and 100% r.h., crack extension in FIGS. 15 and 16 is successively greater than at 75% and lower humidities. After reaching a maximum, crack extension then appears to reverse at these three conditions. For purposes regarding equilibrium, the maximum crack extension at each condition is the point of interest. It is believed that capillary condensation at these beta-eucryptic glass-ceramic microcrack tips in these high humidity environments might also produce a capillary pressures on the crack surfaces. Such would increase the stress at the crack tips, changing the equilibrium position at which they are being driven toward. At these high humidities the amount of water condensing at the crack tips probably increases with humidity. At low humidities, defined by the absence of condensation at the crack tips, it is thought that the equilibrium position the crack is driving toward is independent of humidity level. The critical humidity level above which condensation occurs is dependent upon the radius of the crack. Further support for the effect of capillary forces is at the condition where beta-eucryptite specimens are actually submerged in water. At this condition, the largest degree of crack extension is observed.

From FIGS. 3 and 4 it is clear that the modulus of beta-eucryptite decreases as the microcracks propagate. In an optical waveguide device 19, assuming 10 ksi tensile load on a 125 $\mu$m optical fiber 22, the substrate 20 with a modulus of 3.5 Mpsi and a cross section of 2×4 mm would experience a strain of 4.38 ppm. A modulus decrease of 30% as seen in FIG. 4, would decrease the associated strain by 1.3 ppm. Due to the low stresses in the substrate, this effect is small and dwarfed by possible increases in the unstrained substrate length shown in FIG. 10. This second property of length, increases as a result of the increase in the crack opening displacement of the microcracks as they propagate. The third property that is affected by crack extension is CTE. It is known that the highly negative expansion of beta-eucryptite is extremely dependent upon the presence of microcracks. As these microcracks are driven longer, the CTE becomes more negative. The correlation between CTE and resonance frequency, shown in FIG. 9, supports this. The CTE decrease (shift toward more negative) expected from a modulus decrease of 30% is approximately $8.4 \times 10^{-7}/°$ C., based on calculations using Equations 1 and 2. This is a significant effect if there is the potential for crack extension between the time of CTE measurement and attachment of fiber 22 to substrate 20 when trying to target the substrate CTE. The last property that has been observed to change with extension of microcracks is the strength. As is seen in FIG. 7, the strength clearly decreases.

It is believed that the sealing blunting process occurs through a leaching dissolution and precipitation process, with water being a beneficial agent in the method. It is believed that water assisted corrosion removes material constituents from exposed surfaces of the glass-ceramic, including the interior surfaces created by the microcracks. This leached material is then precipitated at the crack tips causing them to blunt. The TEM image in FIG. 8 confirms the presence of the precipitated material at the crack tips. This effectively decreases the length of the cracks without decreasing the crack opening displacement. This decrease in crack length by filling can be seen in FIG. 16 for the longer time periods after which subcritical crack growth is no longer a factor.

Crack sealing blunting preferably occurs at specific humidity conditions. Based on FIG. 16, decreases in crack length are not observed in the desiccator, 75% r.h., and submerged in water. It is believed that a certain level of water beneficially transports material to the crack tips. At low humidities, water may be corroding the surface, however transport may not be able to occur. At high humidities, surface corrosion occurs and water may condense at the crack tips allowing material to precipitate. When beta-eucryptite is submerged in water, it is believed that corrosion is occurring; however, precipitation may not occur at the crack tips due to the large volume of water and thus, the low concentrations of the dissolved material. In the various gaseous humid environments, the rate of this process is dependent upon the amount of water. Higher humidities increase the rate of the blunting process.

It is believed that this blunting affects a variety of beta-eucryptite substrate properties and in generally the opposite directions as observed with subcritical crack growth; however there is one notable difference in that there is not expected to be any significant dimensional change during the crack blunting process. The crack opening displacement should remain constant.

As these microcracks are progressively blunted, the modulus increases. This modulus increase can be substantial as is shown in FIG. 4 where it recovers almost all of its modulus decrease due to subcritical crack growth. The strength also increases substantially as shown in FIG. 7. This strength increase is important and emphasizes the strong load bearing contribution of the precipitate, shown in the TEM image in FIG. 8, which was deposited at near ambient conditions. The most significant property change that occurs with crack blunting is a positive shift of the CTE. Since the data illustrating the correlation between frequency and CTE in FIG. 9 is from several specimen processes, it is believed that the relationship between CTE and modulus is independent of the extent of subcritical crack growth and crack blunting prior to measurement. Therefore, the relationship represented by Equation 2 should be valid for making predictions of CTE changes from modulus.

Stabilization of beta-eucryptite includes two items related to performance and use in optical waveguide devices. The first is physical dimensional length stability, in that any change in length will shift the center wavelength of the optical waveguide fiber Bragg grating device. The second is the glass-ceramic's negative CTE, in that any change in the CTE will lessen the degree of athernalization of the optical waveguide device.

The invention utilizes the extent of microcrack growth to provide length stability. With this method these cracks are targeted to be driven and extend close to or beyond their equilibrium position, so as to remove the driving force for crack extension within the operating environment of the device. FIG. 15 shows the optimum condition to extend the microcracks is submersion in water. In this environment, crack velocities are largest and crack extension longest. It is believed that after 8 hours the process of crack extension is saturated, thus an overnight soak in water assures sufficient driving of the microcrack, as it is believed that submerging in low temperature increases the degree of crack extension.

The length stability data in FIG. 10 shows that boiling results in a more gradual increase in length than untreated beta-eucryptite; however, with enough time it also reaches a length change of 500 ppm. Such boiling water exposure occurs at higher temperatures, thus, the cracks have lower stresses at their crack tips and are less open than they are at room temperature. Such higher temperature water treatment is believed to be less effective in terms of driving crack growth in that the length increase of the boiled and baked specimen to the same level as the untreated bar indicates that the boil/bake provides minimal extension of cracks. The slower length increase, taking approximately 60 days to saturate, shows that the boil/bake treatment affects microcracked beta-eucryptite. It is believed that such high boiling temperatures may provide some form of crack sealing without the extension of the cracks, with the crack more resistant to subcritical crack propagation, however, the residual stresses are still present to drive the crack, thus the same process of subcritical crack growth takes longer to occur.

Propagation of cracks at lower temperatures where the stresses are higher occur with a boil/cool/bake treatment when the beta-eucryptite remains in a room temperature water bath for 48 hours after a 4 hour boil. FIG. 10 shows that with this treatment the rate as well as the extent of crack extension is significantly decreased, and that the 48 hours in water propagates the cracks. However, the boil preceding the soak may significantly decrease the effectiveness of the 48 hour soak in extending the microcracks. The effectiveness of submerging in water as an initial treatment (with no boiling) is shown by the four beta-eucryptite bars indicated by the open symbols in FIGS. 10 and 11, showing minimal changes in length up to 100 days.

Figure 14:
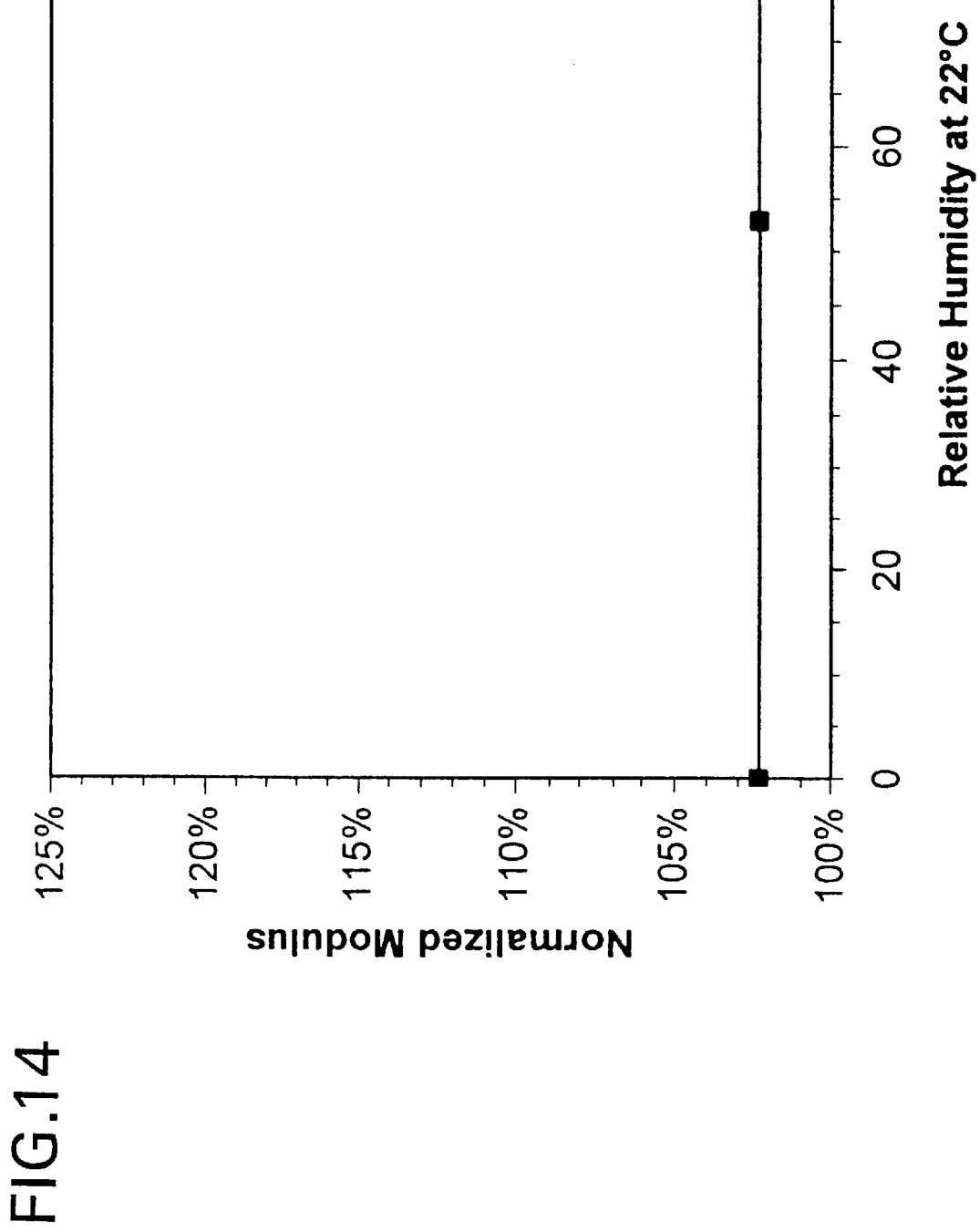
FIG. 14 is a plot of Normalized Modulus (y-axis) versus Relative Humidity at 22° C. (x-axis) that illustrates humidity dependence of modulus increase in beta-eucryptite glass-ceramics after exposure (maximum exposure data from FIG. 13)

It is believed that the long term stability of crack tip blunting is complex in that measurements indicate that the modulus may increase indefinitely or at a minimum for a long time (months) with exposure to 22° C./+90% r.h. or 85° C./85% r.h. For both the boil/bake treatment as well as the preferred stabilization method of submerging in water at 22° C. followed by some sealing blunting treatment at 85° C./85% r.h. as shown in FIGS. 12, 13 and 14. As long as there are surfaces from which material can be dissolved from and crack tip areas where it can be precipitated at, this process is likely to continue. As this process does continue, the modulus and strength will increase and the CTE will shift positive.

Despite the inability of sealing blunting treatments to completely eliminate further blunting, the treatments are still part of the best recommended treatment methods of the invention. It is believed that such blunting treatments pre-emptively slow down subsequent modulus and CTE changes by taking the initial hit. These treatments may also be useful in stabilizing the position of the crack tip by providing some reinforcement. Reliability may be provided for and long term drift of CTE can be eliminated by methods such as by preventing beta-eucryptite from exposure to environmental conditions that are conducive to continued crack blunting through packaging of devices and/or treating the substrate surfaces such that this leaching dissolution/precipitation process (dissolution/precipitating inhibiting surface treatment) does not take place in the offending deployment environments.

The inventive methods and products recognize that a variety of properties of microcracked beta-eucryptite glass-ceramics are linked to subcritical microcrack growth and dissolution/precipitation blunting of crack tips. Subcritical microcrack growth is believed to be mainly responsible for dimensional instability which is observed as a significant increase in substrate length. Subcritical crack extension is also responsible for decreases in strength, modulus and a negative shift in the CTE. Subcritical crack growth occurs when sufficient residual stresses due to the thermal expansion mismatch are available in the presence of even small amounts of water. The most severe environment has been shown to be submerged in water at room temperature, with lower temperatures believed to be more severe in that the lower temperature provides further mismatch. Crack tip sealing blunting is observed in environments where it is believed that condensation of water at the crack tips is possible. Crack tip blunting is responsible for positive shifts in CTE as well as increases in strength and modulus, with no dimensional changes noted with crack blunting, and no saturation limit. A preferred stabilization treatment is submersion in water at 22° C. for 16 hours, followed by at least 1 day in 85° C./85% r.h. and dried at 100° C. for 16 hours.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claim is:

1. A negative thermal expansion substrate for athermalizing an optical waveguide device for use in an optical waveguide deployment environment, said substrate comprising:

a microcracked negative thermal glass-ceramic body having a dimensional length, said glass-ceramic body having a plurality of microcracks, said microcracks having a stabilized saturated subcritical crack growth length wherein said dimensional length of said glass-ceramic body is stabilized when exposed to said optical waveguide deployment environment.

2. A substrate as claimed in claim 1, wherein said dimensional length of said glass-ceramic body changes less than 32 ppm when exposed to said optical waveguide deployment environment.

3. A substrate as claimed in claim 2, wherein said dimensional length of said glass-ceramic body changes less than 16–20 ppm when exposed to said optical waveguide deployment environment.

4. A substrate as claimed in claim 2, wherein said dimensional length of said glass-ceramic body changes less than 16 ppm when exposed to said optical waveguide deployment environment.

5. A substrate as claimed in claim 1, said saturated subcritical crack growth length is longer than a deployment environment propagation length of said microcrack when exposed to said deployment environment.

6. A substrate as claimed in claim 1, said glass-ceramic body having a stabilized elastic modulus when exposed to said optical waveguide deployment environment.

7. A substrate as claimed in claim 1, said glass-ceramic body a stabilized negative thermal expansion when exposed to said optical waveguide deployment environment.

8. A substrate as claimed in claim 1, wherein said saturated subcritical crack growth length does not increase when exposed to said optical waveguide deployment environment.

9. A substrate as claimed in claim 1, said microcracks terminating with a crack tip, wherein said microcrack crack tips are substantially filled with a percipitant of glass-ceramic constituents leached from said glass-ceramic.

10. A substrate as claimed in claim 9, wherein said percipitant of leached glass-ceramic constituents inhibits the growth of said microcracks.

11. A substrate as claimed in claim 1, wherein said glass-ceramic body is a beta-eucryptite aluminosilicate glass-ceramic.

12. A negative thermal expansion substrate for athermalizing an optical waveguide device, said substrate comprising:

a microcracked negative thermal expansion glass-ceramic body having a plurality of microcracks terminating with a crack tip, wherein said microcrack crack tips are substantially filled with a percipitant of glass-ceramic constituents leached from said glass-ceramic body.

13. A substrate as claimed in claim 12, wherein said glass-ceramic body has a change in dimension less than 32 ppm when exposed to a deployment environment of said optical waveguide device.

14. A substrate as claimed in claim 12, wherein said glass-ceramic body is a beta-eucryptite aluminosilicate glass-ceramic.

* * * * *